United States Patent
Gerges et al.

(10) Patent No.: US 10,920,869 B2
(45) Date of Patent: Feb. 16, 2021

(54) DUAL FUNCTION AXLE THERMAL MANAGEMENT SYSTEM

(71) Applicant: Dana Canada Corporation, Oakville (CA)

(72) Inventors: Ihab Edward Gerges, Oakville (CA); Dario Bettio, Mississauga (CA); Michael J. R. Bardeleben, Oakville (CA)

(73) Assignee: Dana Canada Corporation

( * ) Notice: Subject to any disclaimer, the term of this patent is extended or adjusted under 35 U.S.C. 154(b) by 54 days.

(21) Appl. No.: 16/202,895

(22) Filed: Nov. 28, 2018

(65) Prior Publication Data
US 2019/0162291 A1 May 30, 2019

Related U.S. Application Data

(60) Provisional application No. 62/591,263, filed on Nov. 28, 2017.

(51) Int. Cl.
*F16H 57/04* (2010.01)

(52) U.S. Cl.
CPC ..... *F16H 57/0417* (2013.01); *F16H 57/0419* (2013.01); *F16H 57/0423* (2013.01); *F16H 57/0424* (2013.01); *F16H 57/0457* (2013.01); *F16H 57/0483* (2013.01)

(58) Field of Classification Search
CPC ............ F16H 57/0417; F16H 57/0483; F16H 57/0419; F16H 57/0415; F16H 57/0457; F16H 57/0423; F16H 57/0424; B60B 35/16
See application file for complete search history.

(56) References Cited

U.S. PATENT DOCUMENTS

| | | |
|---|---|---|
| 6,223,539 B1 | 5/2001 | Bell |
| 6,830,529 B2 | 12/2004 | Phelan et al. |
| 8,511,111 B2 | 8/2013 | Lambert et al. |

(Continued)

FOREIGN PATENT DOCUMENTS

| | | | |
|---|---|---|---|
| DE | 102011120748 A1 | * | 6/2013 |
| GB | 2553829 A | | 3/2018 |

(Continued)

OTHER PUBLICATIONS

EPO Machine Translation of DE 102011120748 A1 of Ben Haddou, Jun. 13, 2013 (Year: 2013).*

(Continued)

*Primary Examiner* — Vinh Luong
(74) *Attorney, Agent, or Firm* — Ridout & Maybee LLP

(57) ABSTRACT

A system, a differential, and method for maintaining temperature of a fluid circulating in a housing enclosing a gear system, contains a first heat exchanger positioned interior the housing. A first insulation layer is coupled to the housing and having a face in complete contact with the housing. A second fluid passageway formed between the outer surface of the gear and the primary heat transfer surface for the flow of the fluid circulating within the housing therethrough, wherein the fluid is brought into heat transfer relationship with the first heat exchange fluid flowing through said heat exchanger by means of rotation of the gear system.

6 Claims, 14 Drawing Sheets

(56) References Cited

U.S. PATENT DOCUMENTS

| | | | |
|---|---|---|---|
| 8,523,733 B1* | 9/2013 | Lippert | F16C 19/525 |
| | | | 475/348 |
| 8,528,697 B2 | 9/2013 | Mordukhovich et al. | |
| 9,683,649 B2 | 6/2017 | Demitroff et al. | |
| 2007/0169991 A1* | 7/2007 | Bertsch | F02B 77/11 |
| | | | 181/290 |
| 2014/0290922 A1 | 10/2014 | Palanchon | |
| 2016/0312876 A1* | 10/2016 | Demitroff | F16H 57/02 |
| 2016/0312878 A1* | 10/2016 | Katragadda | B60B 35/16 |
| 2016/0377164 A1* | 12/2016 | Fast | F16H 57/0471 |
| | | | 475/160 |
| 2018/0149260 A1* | 5/2018 | Singh | F16H 57/0417 |

FOREIGN PATENT DOCUMENTS

| | | | |
|---|---|---|---|
| JP | 2005-226711 | * | 8/2005 |
| JP | 2008089134 A | | 4/2008 |
| WO | 2014153662 A1 | | 10/2014 |
| WO | WO 2018153534 A1 | * | 8/2018 |

OTHER PUBLICATIONS

Derwent Abstract of JP 2005-226711 A of Ogino, Aug. 25, 2005 (Year: 2005).*
Canadian Intellectual Property Office, International Search Report with Written Opinion in Application No. PCT/CA2018/051511, dated Feb. 19, 2019, 9 pages, Canadian Intellectual Property Office, Gatineau, Quebec, Canada.
PCT/CA2018/051511, Jun. 2, 2020, International Preliminary Report on Patentability.
PCT/CA2018/051511, Jun. 2, 2020, Written Opinion.

* cited by examiner

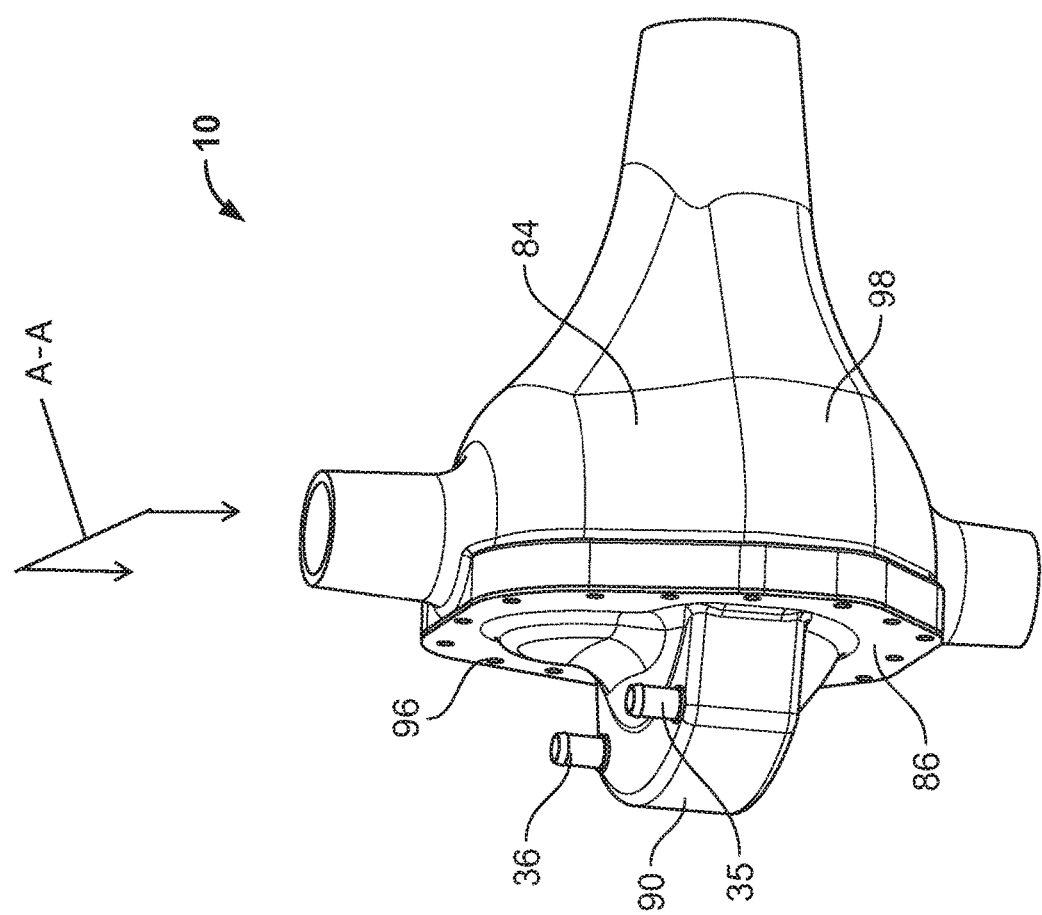
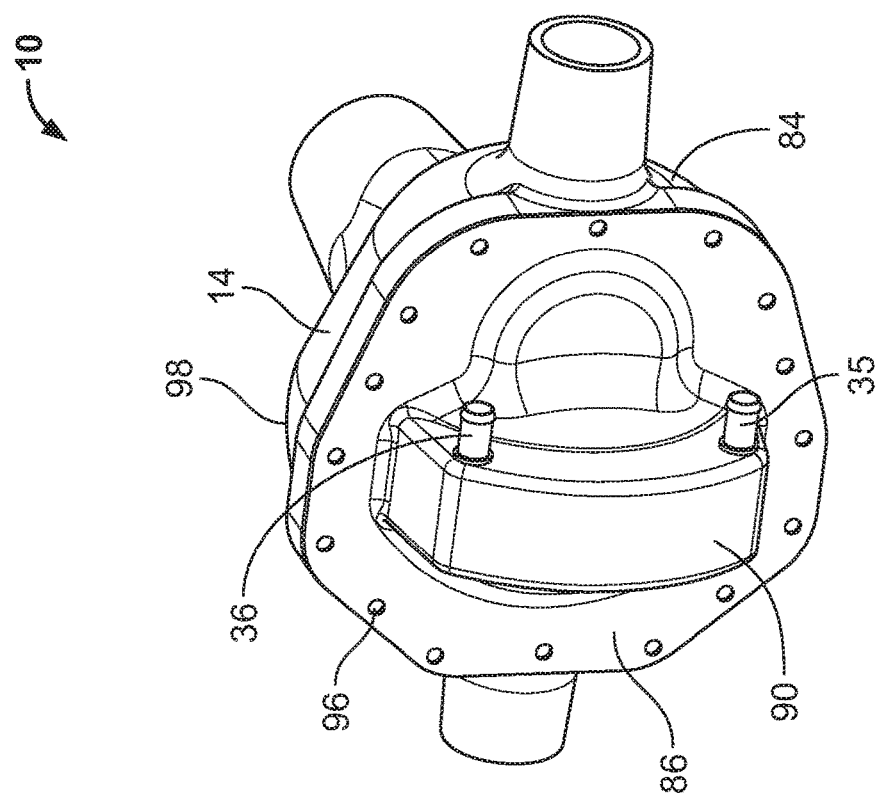
FIG. 8
FIG. 7

DUAL FUNCTION AXLE THERMAL MANAGEMENT SYSTEM

CROSS REFERENCE TO RELATED APPLICATION

This application claims the benefit of and priority to U.S. Provisional Patent Application No. 62/591,263 filed Nov. 28, 2017 under the title DUAL FUNCTION AXLE THERMAL MANAGEMENT SYSTEM. The content of the above patent application is hereby expressly incorporated by reference into the detailed description hereof.

FIELD

The specification relates to a system, having means, for controlling and maintaining temperatures of a fluid within an automobile power and torque transfer system.

BACKGROUND

It is well understood in the automobile industry that automobiles function most efficiently once all fluids are circulating within the automobile systems at their optimum operating temperatures. For instance, heat exchangers for warming/cooling engine oil and transmission oil are known and are often incorporated into automobile systems in order to ensure that the fluids operate within the desired temperature range.

Axle oil and/or manual transmission oil are fluids within automobile systems that benefit from warming and/or cooling in order to reduce the warm-up time of the oil at start-up in order to bring the oil to optimal operating temperature quickly thereby increasing the overall fuel economy of the vehicle. Axle oil and/or manual transmission oil also benefit from cooling once the fluid has reached its desired operating temperature in order to protect not only the oil but to protect the components through which the oil circulates.

Heat exchangers for warming/cooling oil that are located outside of the housing of a power and torque transfer unit typically require an oil pump to flow the oil from within the housing to the externally located heat exchanger. Accordingly, heat exchangers mounted externally to the housing of a power and torque transfer unit often require additional components resulting in a more complex and costly warming/cooling system that occupies more space within the automobile.

Heat exchangers can also be located inside the housing of a power and torque transfer unit to allow for more direct contact between the heat exchanger and the oil circulating within the housing without requiring the addition of a pump. However, conventional flat plate stacked heat exchangers are often difficult to package inside the housing of power and torque transfer units due to the nature of the geometry of the housing.

Differential housings and manual transmission housings often present challenges in terms of providing warming and/or cooling to the axle oil or transmission oil circulating within the respective housings due to the complex geometry of the housing and the gear systems enclosed within them. Accordingly, there is a need for heat exchanger systems that can be more easily packaged within housings of automobile power and torque transfer components that have more complex geometry as a means for providing warming and/or cooling functions to various automobile fluids that circulate within these types of housings in an effort to provide compact and cost-effective solutions with a view to improving overall efficiency of the vehicle.

WO/2014/153662 (incorporated herein by reference) discloses an embodiment of a system for warming/cooling oil circulating within a power and torque transfer system of an automotive vehicle by having one or more heat exchangers positioned within the power and torque transfer system.

There is still a need in the art to improve the efficiency of a system for warming/cooling oil circulating within a power and torque transfer system of an automotive vehicle and helping to control and maintain temperatures of the oil in the power and torque transfer system. In addition, there is a need in the art for a differential unit having components that help to improve the efficiency for warming/cooling oil circulating within a power and torque transfer system, and help to control and maintain temperatures of the oil in the power and torque transfer system. Further, there is a need in the art for a method to help improve the efficiency for warming/cooling oil circulating within a power and torque transfer system, and help to control and maintain temperatures of the oil in the power and torque transfer system.

SUMMARY OF INVENTION

In one aspect, the specification relates to a system for warming and/or cooling a fluid circulating in a housing enclosing a gear system for a power and torque transfer unit, the system having:

a first heat exchanger coupled to the housing for warming and/or cooling the fluid circulating in the housing, the first heat exchanger having:

a tubular member having spaced apart walls defining a fluid passageway therebetween for the flow of a first heat exchanger fluid through the heat exchanger;

a primary heat transfer surface defined by one of said spaced apart walls of the tubular member;

an inlet port and an outlet port in fluid communication with said fluid passageway for inletting and discharging said first heat exchange fluid into said heat exchanger from exterior the housing;

a first insulation layer operatively coupled to the housing for insulating the fluid circulating in the housing, the first insulation layer having a first face and an opposing second face, with the entire first face being in contact with the housing; and a second fluid passageway formed between the outer surface of the gear and the primary heat transfer surface for the flow of the fluid circulating within the housing therethrough;

wherein the fluid is brought into heat transfer relationship with the first heat exchange fluid flowing through the first heat exchanger by means of rotation of the gear system.

In another aspect, the specification relates to a differential unit for an automotive vehicle, having:

a gear system for transmitting torque and rotation to wheels of the automotive vehicle, the gear system comprising at least a ring gear and a pinion gear, the ring gear and pinion gear arranged in meshing relationship for rotational movement;

a housing enclosing said gear system;

a first heat exchanger coupled to the housing for warming and/or cooling the fluid circulating in the housing, the first heat exchanger having:

a tubular member having spaced apart walls defining a fluid passageway therebetween for the flow of a first heat exchanger fluid through the heat exchanger;

a primary heat transfer surface defined by one of said spaced apart walls of the tubular member;

an inlet port and an outlet port in fluid communication with said fluid passageway for inletting and discharging said first heat exchange fluid into said heat exchanger from exterior the housing;

a first insulation layer operatively coupled to the housing for insulating the fluid circulating in the housing, the first insulation layer having a first face and an opposing second face, with the entire first face being in contact with the housing; and a second fluid passageway formed between the outer surface of the gear and the primary heat transfer surface for the flow of the fluid circulating within the housing therethrough;

wherein the fluid is brought into heat transfer relationship with the first heat exchange fluid flowing through the first heat exchanger by means of rotation of the gear system.

In another further aspect, the specification relates to a method for maintaining the temperature of a fluid circulating in a housing of a component of an automotive vehicle enclosing a gear system, the method comprising the steps of:

providing at least a first heat exchanger in the housing, the at least one heat exchanger defining a first fluid passageway between spaced apart walls and forming a second fluid passageway between the outer surface of the gear and one of said walls of said at least one heat exchanger;

supplying a first heat exchange fluid to said first fluid passageway of said at least one heat exchanger;

a first insulation layer coupled to the housing, the first insulation layer having a first face and an opposing second face, with the entire first face being in contact with the housing;

bringing a second heat exchange fluid into heat transfer relationship with said first heat exchange fluid in said at least one heat exchanger in said second fluid passageways through operation and/or rotation of said gear system within said housing;

wherein said second heat exchange fluid is a fluid circulating within the housing of the component of the automotive vehicle.

BRIEF DESCRIPTION OF THE DRAWINGS

Reference will now be made, by way of example, to the accompanying drawings which show example embodiments of the present application, and in which:

FIG. 7 is a perspective view of a power and torque transfer unit in accordance with an example embodiment of the present disclosure;

FIG. 8 is a bottom view of the power and torque transfer unit of the example embodiment shown in FIG. 7;

Similar reference numerals may have been used in different figures to denote similar components.

DESCRIPTION OF EXAMPLE EMBODIMENTS

It is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined herein. Hence, specific dimensions, directions or other physical characteristics relating to the exemplary embodiments disclosed are not to be considered as limiting.

Figure 1:
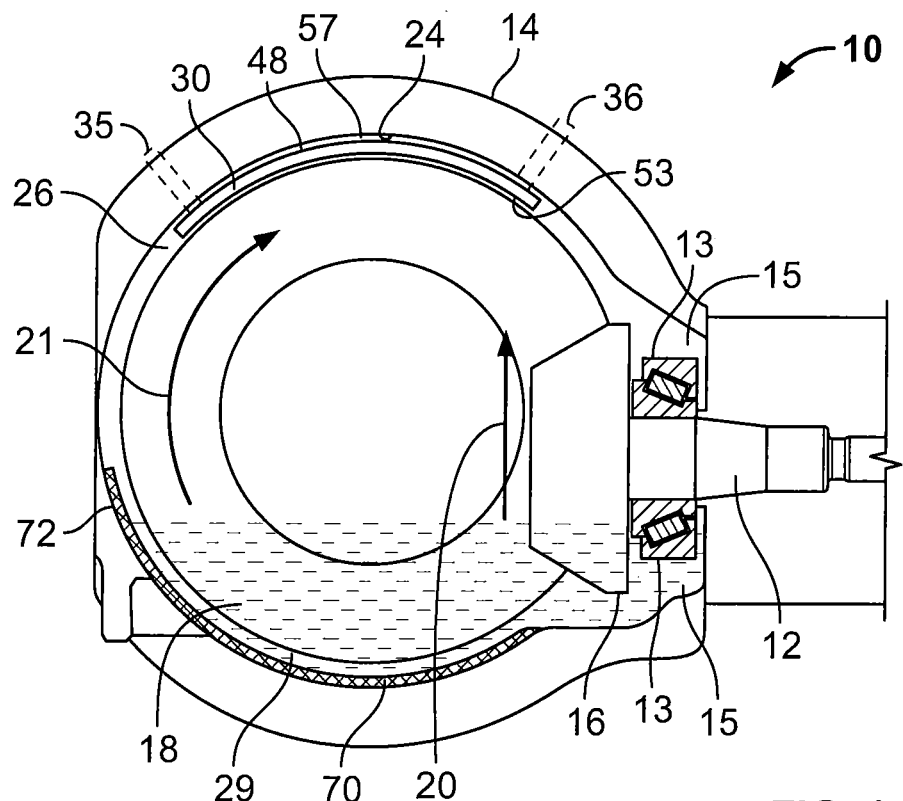
FIG. 1 is a cross sectional diagrammatic view, along the line A-A noted in FIG. 8, of a power and torque transfer unit, such as a differential, in accordance with an example embodiment of the present disclosure.
Figure 1A:
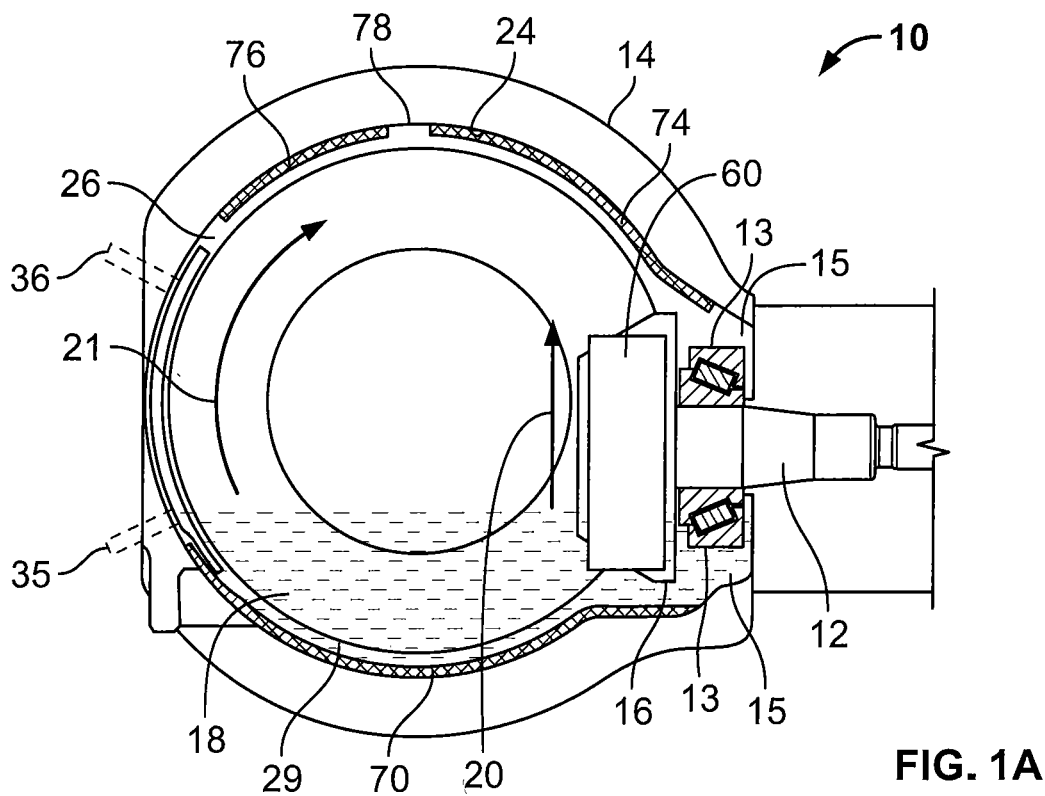
FIG. 1A is a cross-sectional diagrammatic view, along the line A-A noted in FIG. 8, of a power and torque transfer unit in accordance with another example embodiment of the present disclosure.
Figure 1B:
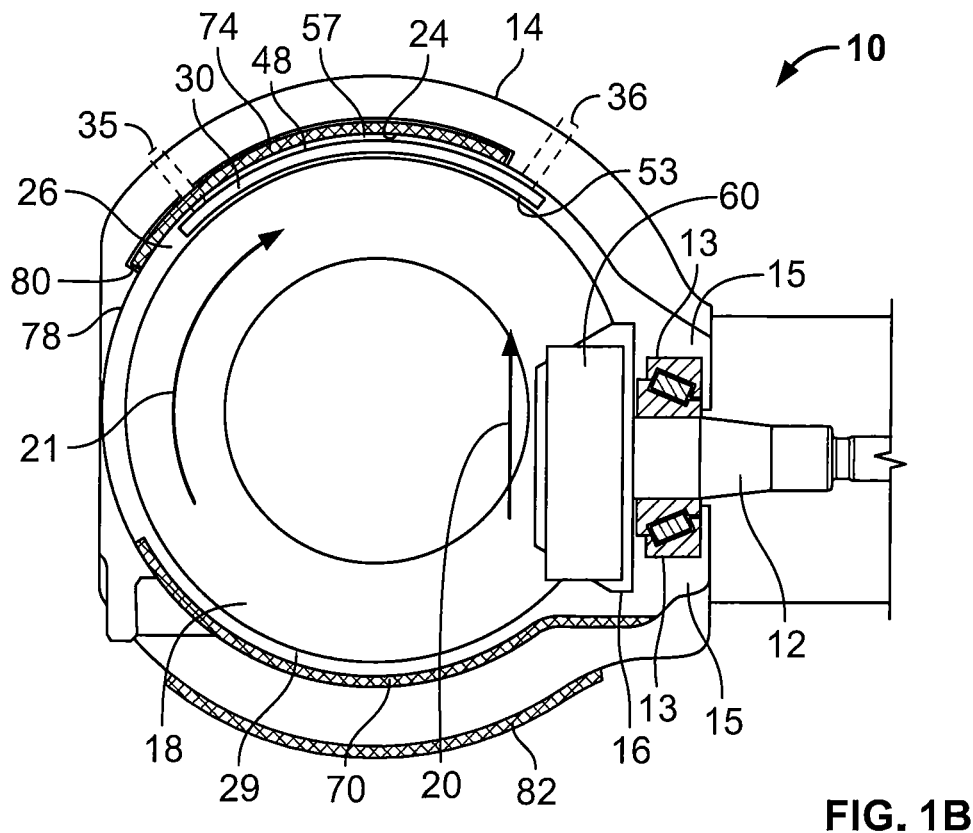
FIG. 1B is a cross-sectional diagrammatic view, along the line A-A noted in FIG. 8, of a power and torque transfer unit in accordance with another further example embodiment of the present disclosure.
Figure 1C:
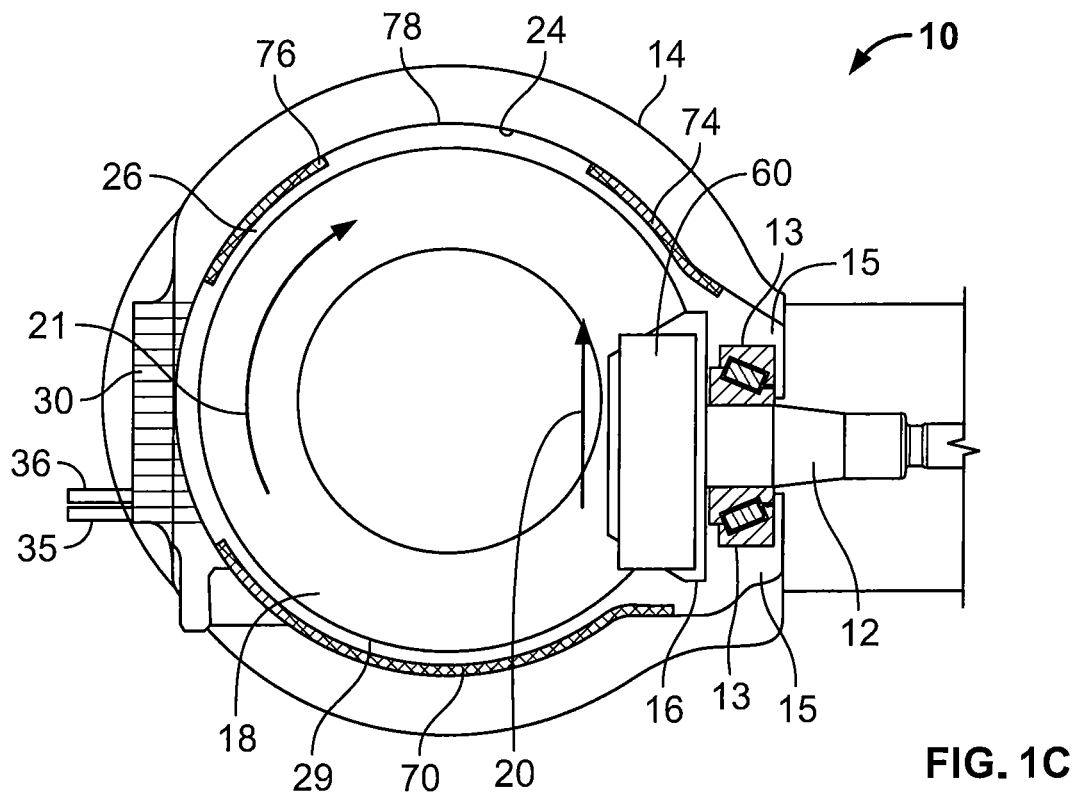
FIG. 1C is a cross-sectional diagrammatic view, along the line A-A noted in FIG. 8, of a power and torque transfer unit in accordance with still another further example embodiment of the present disclosure.
Figure 1D:
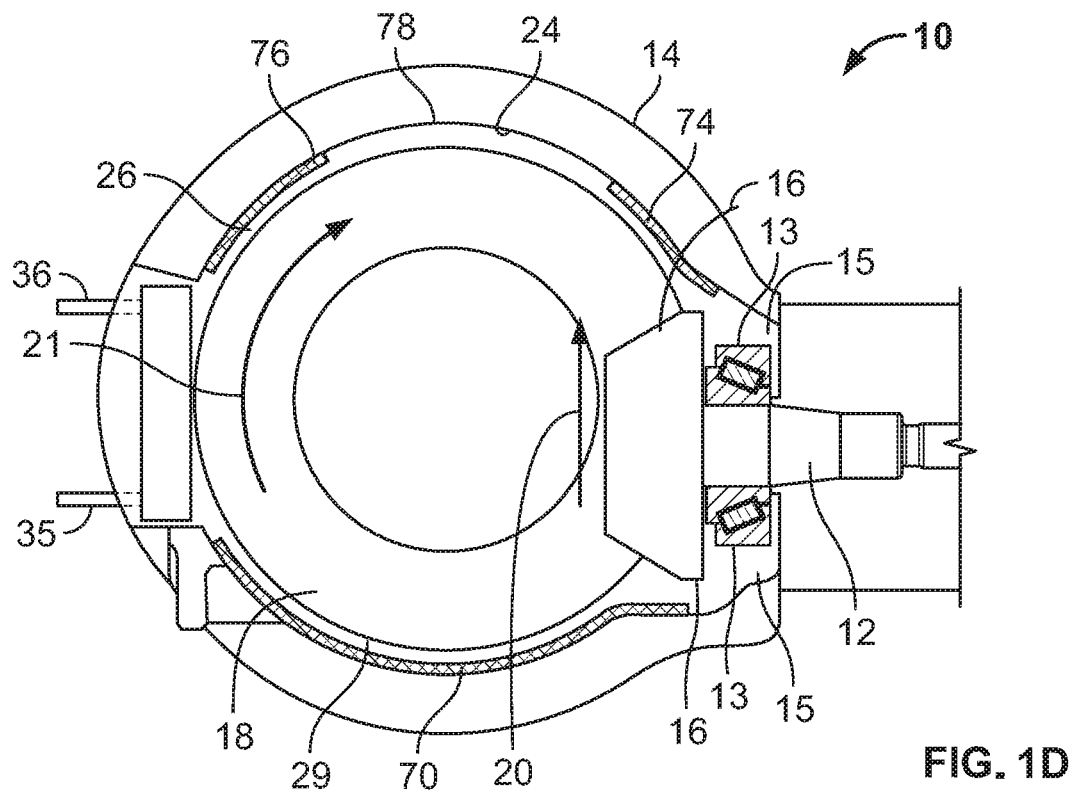
FIG. 1D is a cross-sectional diagrammatic view, along the line A-A noted in FIG. 8, of a power and torque transfer unit in accordance with another still further example embodiment of the present disclosure.

Referring now to FIGS. 1 to 1D, there are shown a cross sectional views of a power and torque transfer unit 10 in the form of a differential from an automotive vehicle according to an example embodiment of the present disclosure. As is understood in the art, the automotive vehicle is powered by an internal combustion engine, the power generated by the engine being transmitted to a transmission and then through a power train or drive train, and eventually on to the drive wheels of the vehicle. The engine is connected to a pinion shaft 12 (a part of which is shown in FIG. 1) and the driving wheels are connected to two other shafts (not shown), the power from the engine being transmitted from the pinion shaft 12 to the drive wheels through power and torque transfer unit 10.

In the subject embodiment, the power and torque transfer unit 10, or differential, has an outer casing or housing 14 that has a generally circular geometry for housing a gear system for transmitting torque and rotation from the pinion shaft 12 to the wheels of the automotive vehicle. The gear system comprises a pinion gear 16 mounted at an end of the drive shaft 12, the pinion gear 16 being arranged in meshing contact with a corresponding ring gear 18. The pinion gear 16 rotates in a first direction, indicated generally by, directional arrow 20, the rotation of the pinion gear 16 causing the ring gear 18 to rotate in a second direction, indicated generally by directional arrow 21, as a result of the meshing relationship between the pinion gear 16 and the ring gear 18, with the axes of rotation of the respective gears 16, 18 being generally perpendicular to each other. Additional gears are incorporated into the gear system contained within the power and torque transfer unit 10 in accordance with principles known in the art. However, the warming and cooling system according to the present disclosure will be described primarily in relation to the pinion gear 16 and ring gear 18 housed, for instance, within the housing of a differential.

As shown in the drawings, the internal surface or inner wall 24 of the housing 14 has a generally circular configuration. The ring gear 18 is sized and shaped so as to generally correspond to the geometry of the inner wall 24. A first gap 26 is formed between the inner wall 24 of the housing 14 and the outermost edge of ring gear 18. A second gap 28 (as shown schematically in FIG. 2A) is formed between the inner wall 24 of the housing 14 and outer surface of the pinion gear 16, the second gap 28 likely being larger that first gap 26. While the first gap 26 is shown in FIG. 1 as being generally annular in shape with the size of the first gap 26 being rather consistent about the perimeter of the ring gear 18, it will be understood that this is not necessarily the case. More specifically, it will be understood that the actual shape and size of the first gap 26 will depend on the specific geometry and construction of the differential housing 14 as the size of the first gap 26 will correspond to the actual distance between the outer surface of the ring gear 18 and the inner wall 24 of the housing 14 which may vary about the perimeter of the ring gear 18.

A first insulation 70 is provided on a first internal surface 72 of the housing 14. The first internal surface 72 of the housing 14 corresponding to the lower half (sump portion) of the housing 14, where the oil or lubricating fluid collects and stored during inactivity of the gears 16, 18. The first insulation 70 used is not particularly limited, and can vary depending upon design and application requirements, so long as the first insulation 70 can insulate the housing 14 to help retain the heat within the housing and/or maintain the temperature of the oil or lubricating fluid that circulates within the housing 14. Hence, the material of construction of the first insulation 70 is not particularly limited, and materials that are compatible for use within a housing 14 containing oil or lubricating fluid, while providing insulation can be used. Such materials are not particularly limited and should be known to persons of skill in the art.

As noted above, and shown in FIGS. 1-1D, the first insulation 70 is present on the lower half (reservoir or sump portion) of the housing 14. The extent to which the first insulation 70 covers the lower half of the housing 14 is not particularly limited, and can vary, depending upon design and application requirements. In one embodiment, as shown in FIG. 1, the first insulation 70 covers nearly the entire lower half of the housing 14, without being present underneath the pinion gear 16 or in the second gap 28. While in other embodiments (FIGS. 1A and 1B), less than the entire lower half of the housing 14 can also be covered. Further, as shown in FIGS. 1A and 1B, the first insulation can also be present underneath the pinion gear 16, providing insulation in both the first gap 26 and the second gap 28.

Furthermore, as shown in the embodiment of FIG. 1A, a portion of the first insulation 70 present in the lower half of the housing 14 can overlap a portion of the first heat exchanger 30. In addition, as shown in FIGS. 1A and 1C, a second insulation layer 74 and a third insulation layer 76 can be provided on the second inner surface 78 of the housing 14. The second inner surface 78 of the housing 14 corresponding to the upper half of the housing 14 and opposed to the first inner surface 72 of the housing 14. As shown in FIGS. 1A, 1C and 1D, a portion of the second insulation 74 is positioned to be proximate to the pinion gear 16 in the second gap 28, while the third insulation 76 is distil from the pinion gear 16. This leads to spacing between the second insulation 74 and the third insulation 76 permitting dissipation of heat from the power and torque transfer unit 10. The distance between the second insulation 74 and the third insulation 76 is not particularly limited and can vary depending upon design and application requirements, to help control and maintain the temperature within the power and torque transfer unit 10 at a higher efficiency. As shown in FIGS. 1C and 1D, the spacing between the second insulation 74 and the third insulation 76 is much more than the spacing between the second insulation 74 and the third insulation 76, shown in the embodiment of FIG. 1A.

In another further embodiment, as shown in FIG. 1B, a second insulation layer 74 is positioned in a cut-out 80 formed in the second inner surface 78 of the housing 14. The second insulation layer 74 in such an embodiment, for example and without limitation, has a major portion that overlaps with the first heat exchanger 30. Although not shown, in a further embodiment, the second insulation layer 74 can also be positioned on the second inner surface 78 and in contact with the outer surface of the first heat exchanger 30, to eliminate any annular space 57 between the outer surface of first heat exchanger 30 and the second insulation layer 74. Moreover, as shown in FIG. 1B, the power and torque transfer unit 10 can also be provided with an outer insulation 82 to help with obtaining improved efficiency insulation and retaining the heat energy within the power and torque transfer unit 10. As described with the other embodiments disclosed herein with regard to the first, second and third insulation (70, 74, 76), the outer insulation 82 can be varied depending upon design and application requirements, with regard to size, shape and composition. Further, the material of construction of the outer insulation 82 can be different from the first, second and third insulation (70, 74, 76), as no contact with oil or lubricant occurs during operation. Further, the outer insulation 82 can help to improve the insulation characteristics of the power and torque transfer unit 10. Moreover, although the outer insulation 82 is shown on the lower half of the power and torque transfer unit 10, as should be recognized by those of skill in the art, the outer insulation can be provided on the upper half of the power and torque transfer unit 10 only, or both the upper and lower half power and torque transfer unit 10, covering it nearly completely.

Figure 2:
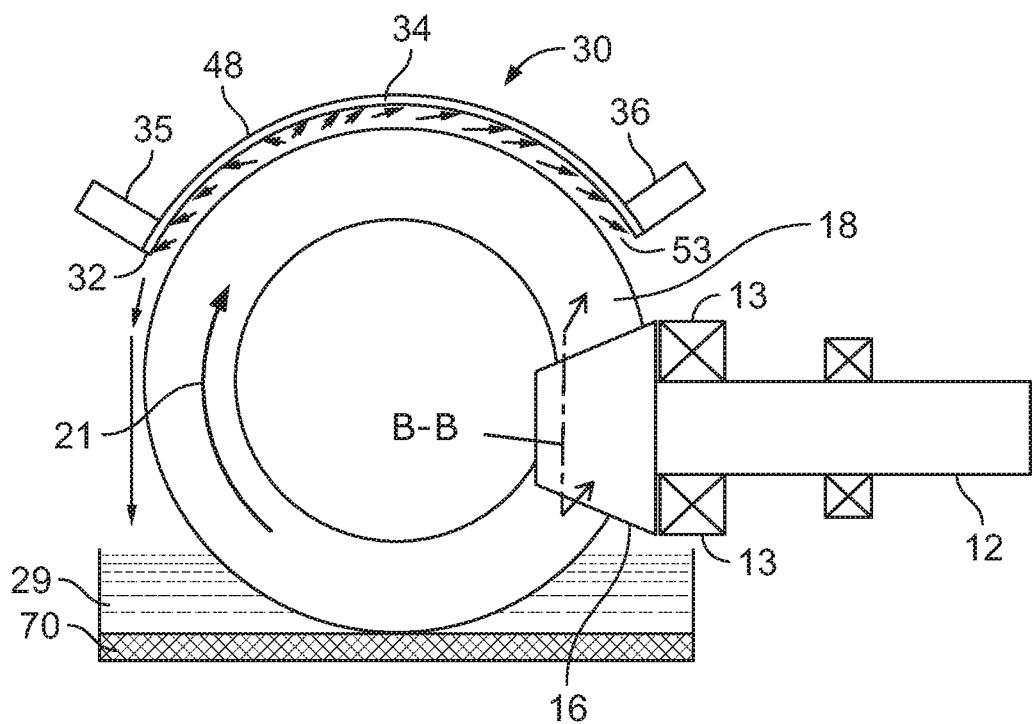
FIG. 2 is a cross sectional schematic view, along the line A-A noted in FIG. 8, of a portion of the power and torque transfer unit shown in FIG. 1.

Oil, or any other suitable lubricating fluid, is circulated through the housing 14 to ensure proper functioning of the gear system. The bottom or lower portion 29 of the housing 14 typically acts as an oil sump or reservoir within the housing 14 in which the oil collects. Accordingly, the gap 26 found at the lower portion 29 of the housing 29 may be larger than the gap 26 found elsewhere between the ring gear 18 and the inner wall 24 of the outer housing 14 about the perimeter of the ring gear 18. This may be due to the formation of a pocket or recessed area (shown only schematically in FIG. 2) within the housing 14.

As the pinion gear 16 and ring gear 18 rotate within the housing 14, the oil circulates through the first and second gaps 26, 28 and around the various other components of the gear system creating an oil flow within the housing 14, the speed of the oil flow within the housing 14 varying depending upon the speed of rotation of the gears and depending upon the viscosity of the oil. Accordingly, the speed of the oil flow within the housing 14 will also vary depending upon the temperature of the oil which will change, for instance, from cold start conditions to normal operating temperatures due to the changes in viscosity of the fluid. It is important that the oil flow within the housing 14 is maintained to ensure that all of the components housed within the power and torque transfer unit 10, or differential, are properly lubricated to ensure proper functioning of the components. In particular, in the case of a differential, it is important that the oil flow within the housing 14 reaches the pinion shaft 12 and associated pinion bearings 13 in the pocket 15 formed about the pinion shaft 12 within the housing 14 to ensure adequate lubrication of these components during operation of the vehicle. Accordingly, oil flow to pinion shaft pocket 15 should not be hampered or obstructed. Oil flow around the ring gear 18 in the first gap 26 between the outer surface of ring gear 18 and in the inner surface 24 of the outer housing 14 is also desirable. It will be understood that a similar oil flow is created through the second gap 28 between the outer surface of the pinion gear 16 and the inner wall 24 of the outer housing 14, as shown for instance in FIG. 2A.

At start-up, fluids within the automobile system (for instance engine oil, transmission oil, axle oil, manual transmission oil, etc.) are not at optimal operating temperatures as the fluids have increased viscosity due to the reduced temperature of the fluids at start-up which adversely affects the efficiency of the various automobile systems. As the temperature of the fluids increase, through operation of the automobile, the viscosity of the fluids is reduced and the fluids flow more efficiently through the fluid lines and within the various components of the automobile systems resulting in more efficient overall operation of the automobile itself. Accordingly, the power and torque transfer unit 10, in this case the differential, will operate more effectively once the oil circulating through the housing 14 is at its optimal operating temperature. As the temperature of the fluids within the automobile system increase through operation of the automobile, it is also important to ensure that the temperature of the fluids remain in their optimal temperature range since the fluid properties breakdown outside their optimal temperature range which can result in damage to various systems and/or components of the automobile, for instance the differential, or manual transmission.

Therefore, in accordance with the exemplary embodiment of the present disclosure, the power and torque transfer unit 10 is provided with a first heat exchanger 30. The position and shape of the heat exchanger is not particularly limited, and can vary depending upon design and application requirements. In one embodiment, as shown in FIGS. 1, 1A and 1B, the first heat exchanger is mounted within the first gap 26 within the housing 14 of the power and torque transfer unit 10 in this case a differential, for example, between the ring gear 18 and the inner wall 24 in order to provide for warming and cooling of the oil circulating within the housing 14. The first heat exchanger 30 comprises a tubular member 32 enclosing a fluid passageway 34 for the flow of a first heat exchange fluid (e.g. coolant) through the heat exchanger 30. The fluid passageway 34 is in fluid communication with respective inlet and outlet ports 35, 36 for inletting and discharging the first heat exchanger fluid to and from the heat exchanger 30. While the tubular member 32 may be formed as a unitary, elongated tubular structure, it may also be formed by a pair of corresponding mating plate pairs 38, 40 as shown schematically in FIGS. 3-6. For instance, the mating plate pairs 38, 40 may be formed having a raised central portion surrounded by a peripheral flange that define the fluid passageway there-between when the plates are arranged in their face-to-face mating relationship in accordance with principles known in the art. A turbulizer or other heat transfer augmenting device, i.e. dimples, ribs or other surface enhancements (shown only schematically in FIG. 4), may be positioned or formed within fluid passageway 34 depending upon the particular design and application of heat exchanger 30.

As shown more specifically in FIGS. 3-6, the tubular member 32 forming heat exchanger 30 is generally rectangular in shape although curved so as to generally follow the curvature of the inner wall 24 of the housing 14 as well as the curvature of the outer edge of the ring gear 18. Accordingly, in some embodiments, the heat exchanger 30 may be somewhat of a "banana-shaped" heat exchanger. The heat exchanger 30, therefore, in such an embodiment is arcuate in structure having a length 42 corresponding to a portion of the outer circumference of the ring gear 18 (or inner circumference of the inner wall 24 of the housing 14), a width 44 corresponding generally to a portion of the width of the housing 14 and a depth 46 corresponding to a portion of the annular gap 26 provided between the ring gear 18 and the inner wall 24 of the housing 14 to enable oil to flow intermediate the heat exchanger 30 and the ring gear 18.

In the embodiments noted above, the fluid passageway 34 extends along the length 42 of the tubular member 32. Accordingly, it will be understood that the heat exchanger 30 is curved about an axis that is generally perpendicular to the direction of fluid flow in the passageway 34. Fluid passageway 34 can be designed as a single pass fluid flow passageway (e.g. I-flow) or as a two pass fluid flow passageway (e.g. U-flow) as shown schematically in FIG. 6 in accordance with principles known in the art. The inlet and outlet ports 35, 36 are located on the back or outer surface 48 of the tubular member 32 in communication with corresponding inlet/outlet fittings that extend through corresponding openings (not shown) formed in the wall of the housing 14 for directing the first heat exchanger fluid into and out of fluid passageway 34. Accordingly, when the heat exchanger 30 is designed as a single pass or I-flow heat exchanger, the inlet and outlet ports 35, 36 are located at opposed ends of the heat exchanger 30. When the heat exchanger 30 is designed as a two pass or U-flow heat exchanger, the inlet and outlet ports 35, 36 are located adjacent to each other at one end of the heat exchanger 30. Accordingly, whether a single or two-pass heat exchanger 30 is used may depend on the desired location of the inlet/outlet fittings and/or the corresponding openings formed in the housing 14.

Figure 3:
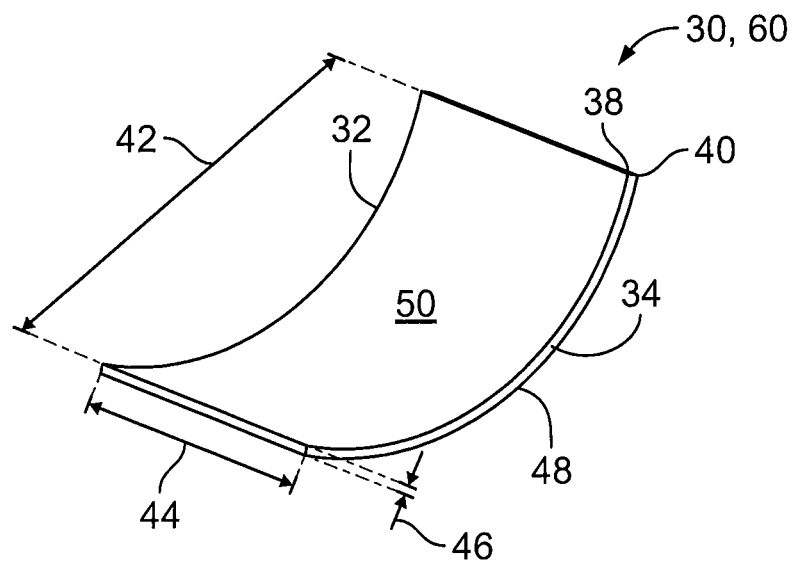
FIG. 3 is a schematic representation of an example embodiment of a heat exchanger for incorporating into the system of any of FIGS. 1, 1A, 1B.
Figure 4:
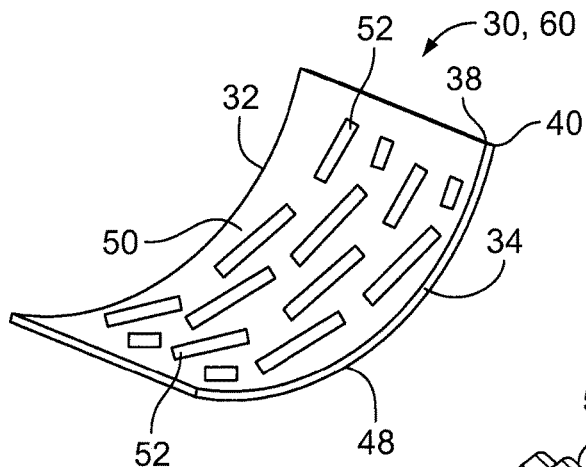
FIG. 4 is a schematic representation of variation of the heat exchanger shown in FIG. 3.
Figure 5:
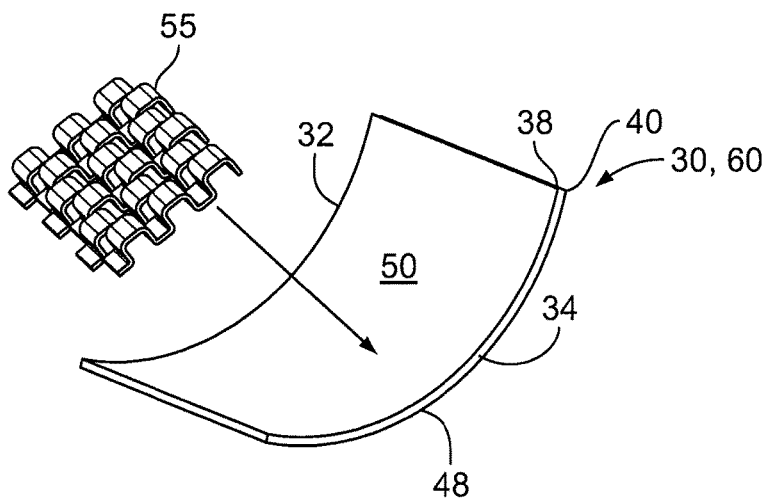
FIG. 5 is a schematic representation of another variation of the heat exchanger shown in FIG. 3.

The front or inside surface 50 of the tubular member 32 is generally a continuous surface for transmitting heat to or from the first heat exchange fluid flowing through the tubular member 32 to or from the oil circulating in the differential housing in the annular space or fluid channel 53 formed between the ring gear 18 and the front or inner surface 50 of the heat exchanger 30. Accordingly, the oil circulating in the fluid channel 53 between the ring gear 18 and the front or inner surface 50 of the heat exchanger 30 acts as a second heat exchange fluid that is brought into heat transfer relationship with the first heat exchange fluid flowing through the heat exchanger 30. The front or inner surface 50 of the heat exchanger 30 is the primary heat transfer surface of the heat exchanger 30 and may be formed as a plain surface as shown in FIG. 3 or may be formed with protrusions 52 or other forms of surface enhancements (e.g. dimples, ribs, etc.) as shown schematically in FIG. 4 for increasing heat transfer performance of the heat exchanger 30. In other embodiments, a separate heat transfer surface 55 in the form of a low density fin or turbulizer may be mounted or fixed to the front or inner surface 50 of the heat exchanger 30, as shown schematically in FIG. 5, for increasing heat transfer performance of the heat exchanger 30.

In some exemplary embodiments, the heat exchanger 30 is arranged and strategically positioned within the first gap 26 to prevent oil from actively flowing in the annular space 57 formed between the back or outer surface 48 of the heat exchanger 30 and the inner wall 24 of the housing 14 so that there is little to no heat transfer on the outer surface 48 of the heat exchanger 30. In such instances, the annular space 57 is minimized to effectively prevent active oil flow across the outer surface 48 of the heat exchanger 30 resulting in a thermal insulation effect in the region of the annular space 57 that spans a portion of the housing 14 since any oil circulating within the housing that has been warmed by heat exchanger 30 does not lose its heat to the outer housing 14. The annular space 57 can also serve as a supporting fixture and may also provide for vibration attenuation. As an exemplary embodiment, as discussed above, the annular space 57 can be eliminated by presence of a second (or third) insulation layer 74 (76), which can further help with maintaining the temperature of the power and torque transfer unit (for example, a differential) 10 and for maintaining the temperature of the oil or lubricating fluid.

In other exemplary embodiments, however, the annular space 57 may serve as a fluid channel for the flow of oil over the outer surface 48 of the heat exchanger 30 for heat transfer between the oil flowing in annular space 57 and the first heat exchange fluid flowing through the heat exchanger 30, especially in embodiments where the first gap 26 is large enough to allow for an annular space 57 between the inner surface of the outer housing and the outer surface of the heat exchanger. Accordingly, in embodiments where oil does flow in the annular gap 57, it will be understood that both the inner and outer surfaces 50, 48 of the heat exchanger 30 serve as heat transfer surfaces.

In operation, the rotation of the pinion gear 16 and ring gear 18 causes the oil from the sump or reservoir at the lower portion 29 of the housing 14 to circulate within the housing 14 around the ring gear 18. As the oil flows over the upper portion of the ring gear 18 the oil tends to separate with a portion of the flow continuing in the direction of rotation of the ring gear 18, while another portion tends to flow in the opposite direction, driven by gravity, back towards the sump or reservoir 29. The oil flow over the ring gear 18 is shown schematically in FIG. 2. The exact location of the separation in the oil flow from the surface of the ring gear 18 depends on the ring gear speed as well as the viscosity of the oil (or fluid) flowing over the gear and, therefore, will be different for different speeds of rotation and will also depend on the temperature of the oil (or fluid) at various operating conditions. The heat exchanger 30, therefore, is sized and positioned within the housing 14 to ensure that a maximum amount of oil flow passes through the fluid channel 53 to ensure optimal heat transfer occurs between the oil and the first fluid flowing through the heat exchanger 30. The positioning of heat exchanger 30 within first gap 26 also does not adversely affect the oil flow within the housing 14 from reaching the pinion shaft pocket 15.

A similar oil flow pattern occurs over the exterior of the pinion gear 16 in the second gap 28 (shown in FIG. 2A) formed between the pinion gear 16 and the inner wall 24 of the housing 14 with oil flow being swept over the outer surface of the pinion gear 16 and being returned to the sump or reservoir 29 while some flow separates and flows in an opposite direction, driven by gravity, towards the sump 29.

Figure 2A:
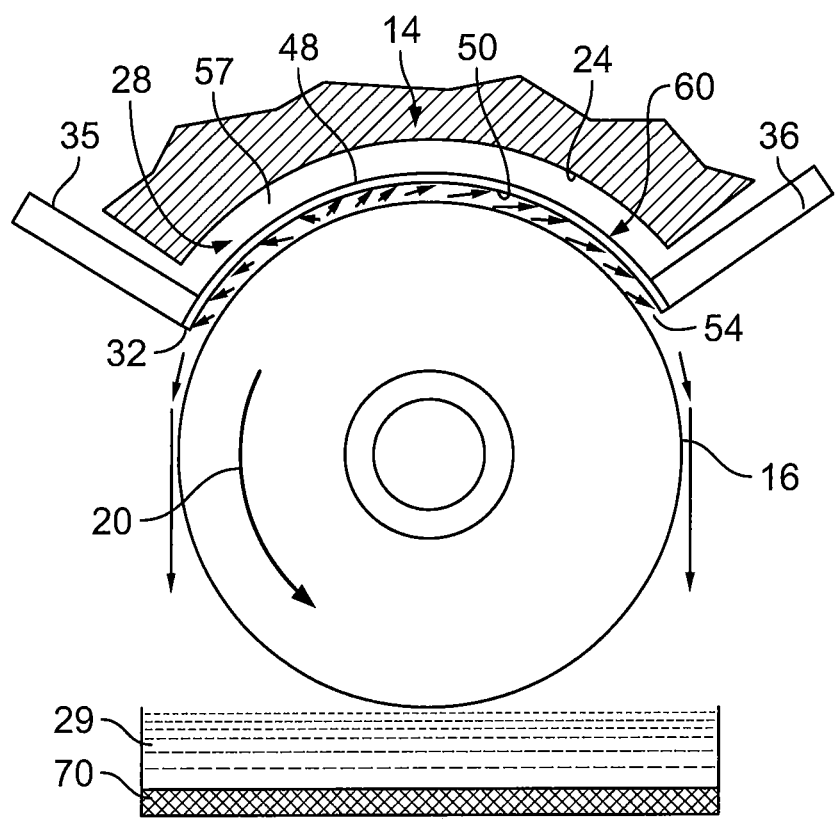
FIG. 2A is a cross sectional schematic view, along the line B-B noted in FIG. 2, of a portion of the power and torque transfer unit shown in FIG. 1.

In instances where the geometry of the housing 14 or the components housed within the outer housing 14 is not conducive to having heat exchanger 30 positioned within the first gap 26, a second heat exchanger 60 may be provided in the second gap 28 found between the outer surface of the pinion gear 16 and the inner wall 24 of the housing 14, as shown in FIG. 2A, as an alternative to the first heat exchanger 30 as shown in FIG. 1A. The second heat exchanger 60 generally has the same form as the first heat exchanger 30 described above and shown in FIGS. 3-6. Accordingly, heat exchanger 60 is generally rectangular in shape and, in this instance, is curved so as to generally follow the curvature of the inner wall 24 of an upper portion of the housing 14 as well as the curvature of the pinion gear 16 and, may, therefore, also be somewhat of a "banana-shaped" heat exchanger. Therefore, the exact curvature of the first and second heat exchangers 30, 60 will be different given that the diameter of the pinion gear 16 is generally much smaller than the diameter of the ring gear 18.

It will also be noted that the second heat exchanger 60 is generally positioned or oriented perpendicular to the general placement of the first heat exchanger 30. Therefore, whether the first or second heat exchanger 30, 60 is used, the first and second heat exchangers 30, 60 are generally curved about the axis of rotation of the corresponding gear (i.e. the ring gear 18 or the pinion gear 16). Therefore, the fluid passageway 34 in the second heat exchanger 60 will be oriented such that the flow direction within the fluid passageway 34 is generally perpendicular to the flow direction associated with the fluid passageway 34 in the first heat exchanger 30, when the first heat exchanger 30 is used. Accordingly, for both the first heat exchanger 30 and the second heat exchanger, the tubular member 32 forming the heat exchanger 30, 60 is curved about an axis that is generally perpendicular to the direction of fluid flow within the corresponding fluid passageway 34.

As with the example embodiment incorporating the first heat exchanger 30, by positioning the second heat exchanger 60 over pinion gear 16, a second fluid channel or passageway 54 is formed between the outer surface of the pinion gear 16 and the inner surface 50 of the second heat exchanger 60 shown schematically in FIG. 2A. As the oil circulates within the housing 14 during operation of the vehicle, the oil will flow through the passageway 54 formed between the pinion gear 16 and the second heat exchanger 60 thereby bringing the oil into heat transfer relationship with the first heat exchanger fluid flowing through the second heat exchanger 60. By positioning heat exchanger 60 over the pinion gear 16 within the oil flow that is created within the main housing 14 during operation of the automobile, oil flow to the pinion shaft pocket 15 to provide lubrication to the pinion shaft 12 and pinion shaft bearings 13 is not adversely affected. Accordingly, warming and/or cooling of the oil can occur by means of strategic positioning of the first or second heat exchanger 30, 60 within the housing 14 without adversely affecting the operation of the power and torque transfer unit 10.

Figure 6:
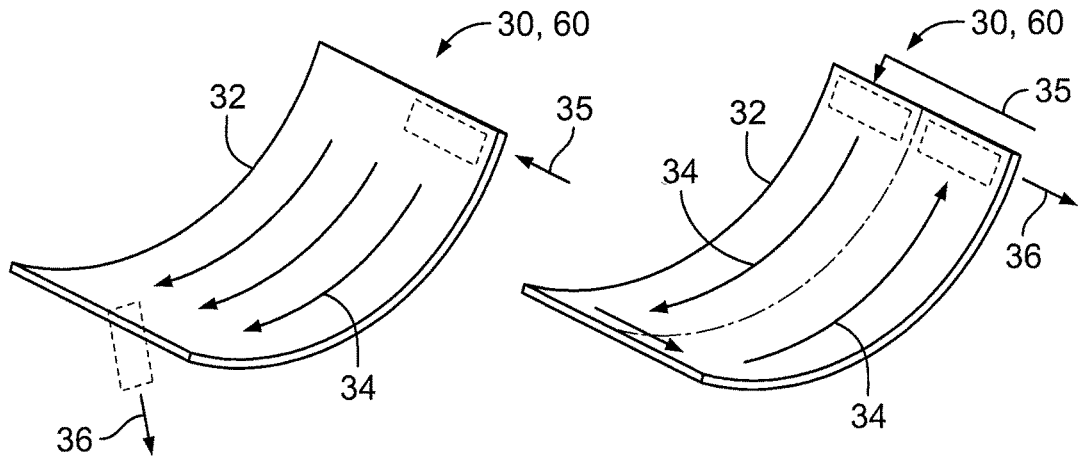
FIG. 6 is a schematic representation of two exemplary flow paths through the heat exchanger of any one of FIGS. 3-5.
Figure 9:
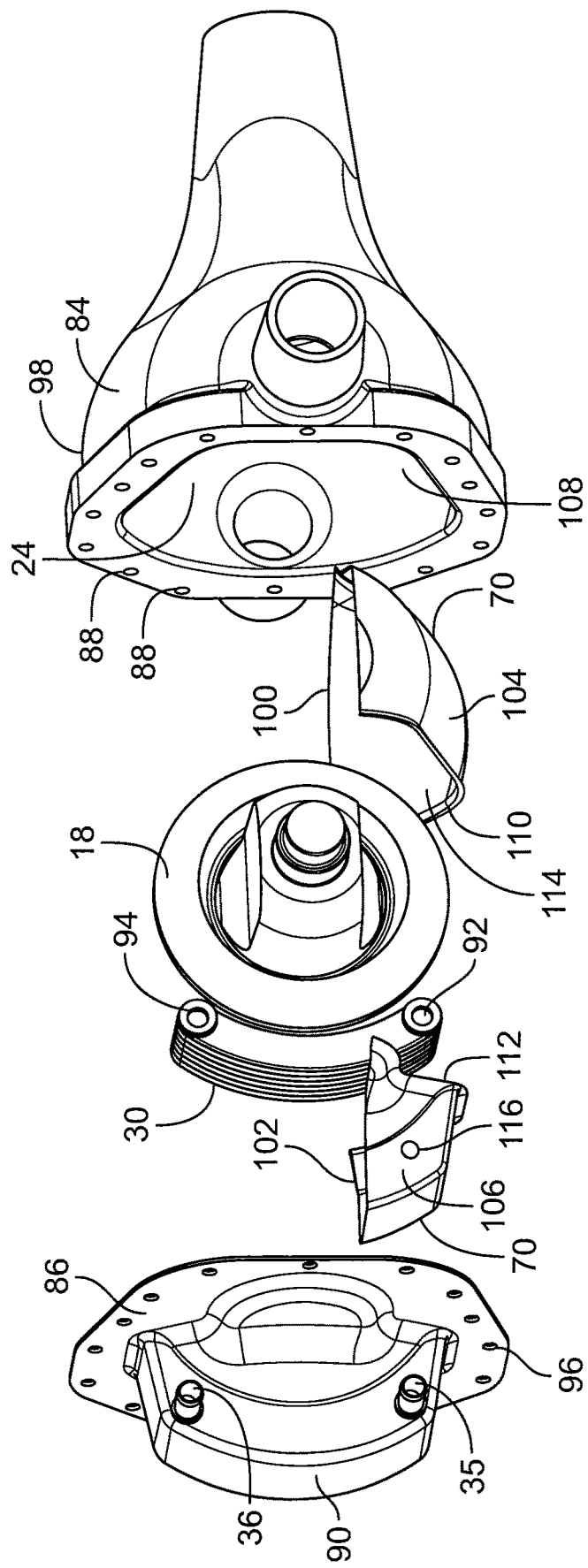
FIG. 9 is an exploded side view at an angle of the power and torque transfer unit of the example embodiment shown in FIG. 7.
Figure 10:
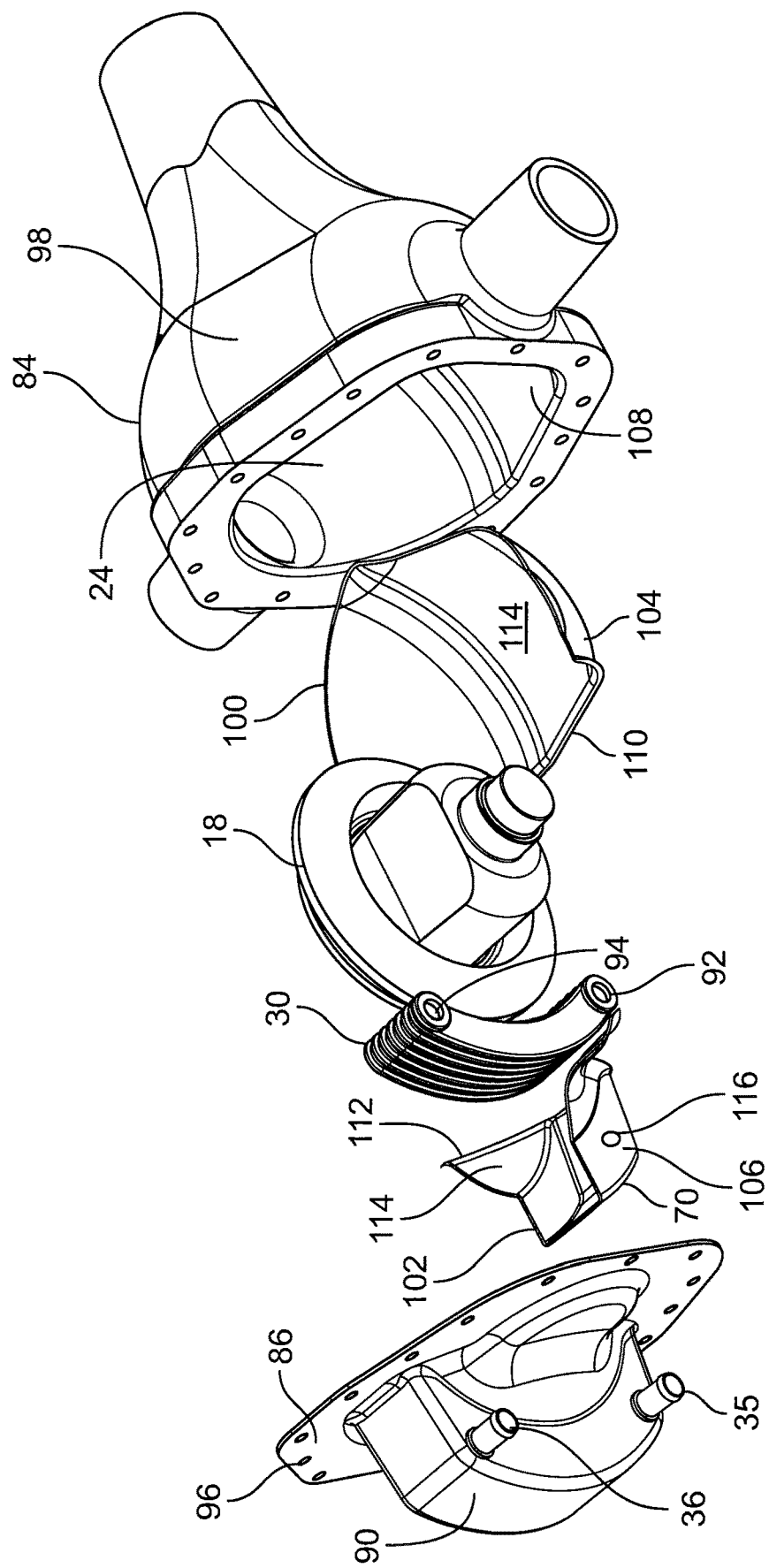
FIG. 10 is an exploded top view at an angle of the power and torque transfer unit of the example embodiment shown in FIG. 7.
Figure 11:
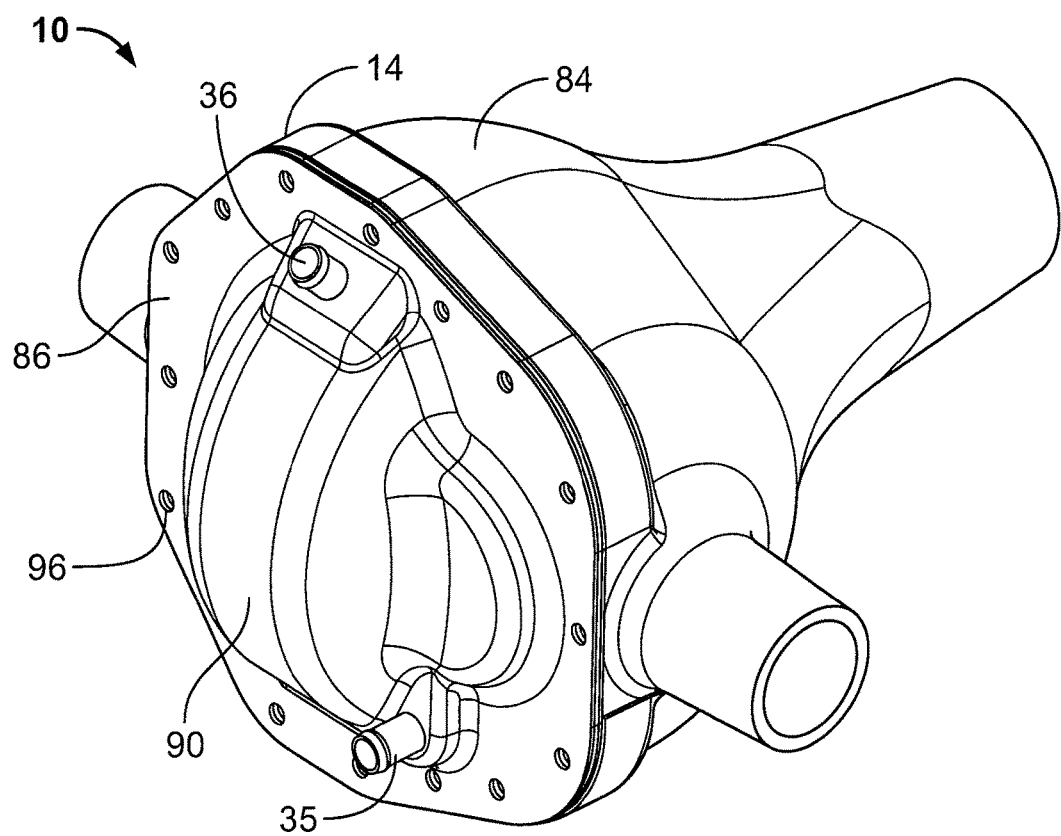
FIG. 11 is a perspective view of a power and torque transfer unit in accordance with another example embodiment of the present disclosure.
Figure 12:
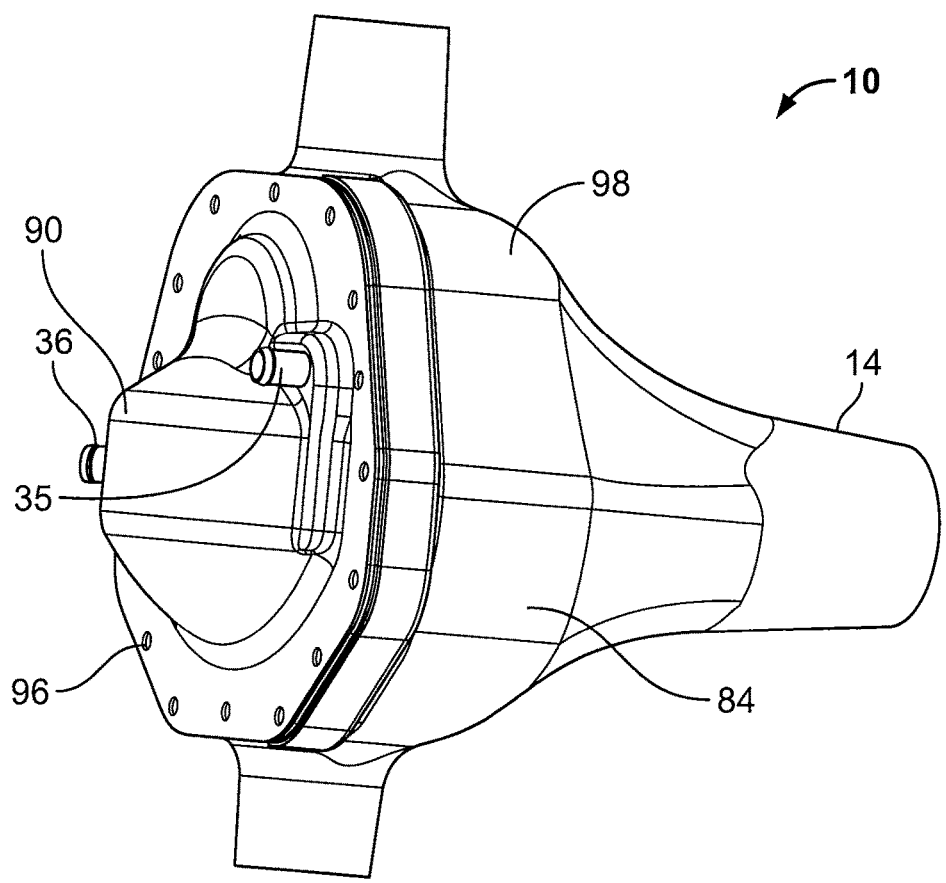
FIG. 12 is a bottom view of the power and torque transfer unit of the example embodiment shown in FIG. 11.
Figure 13:
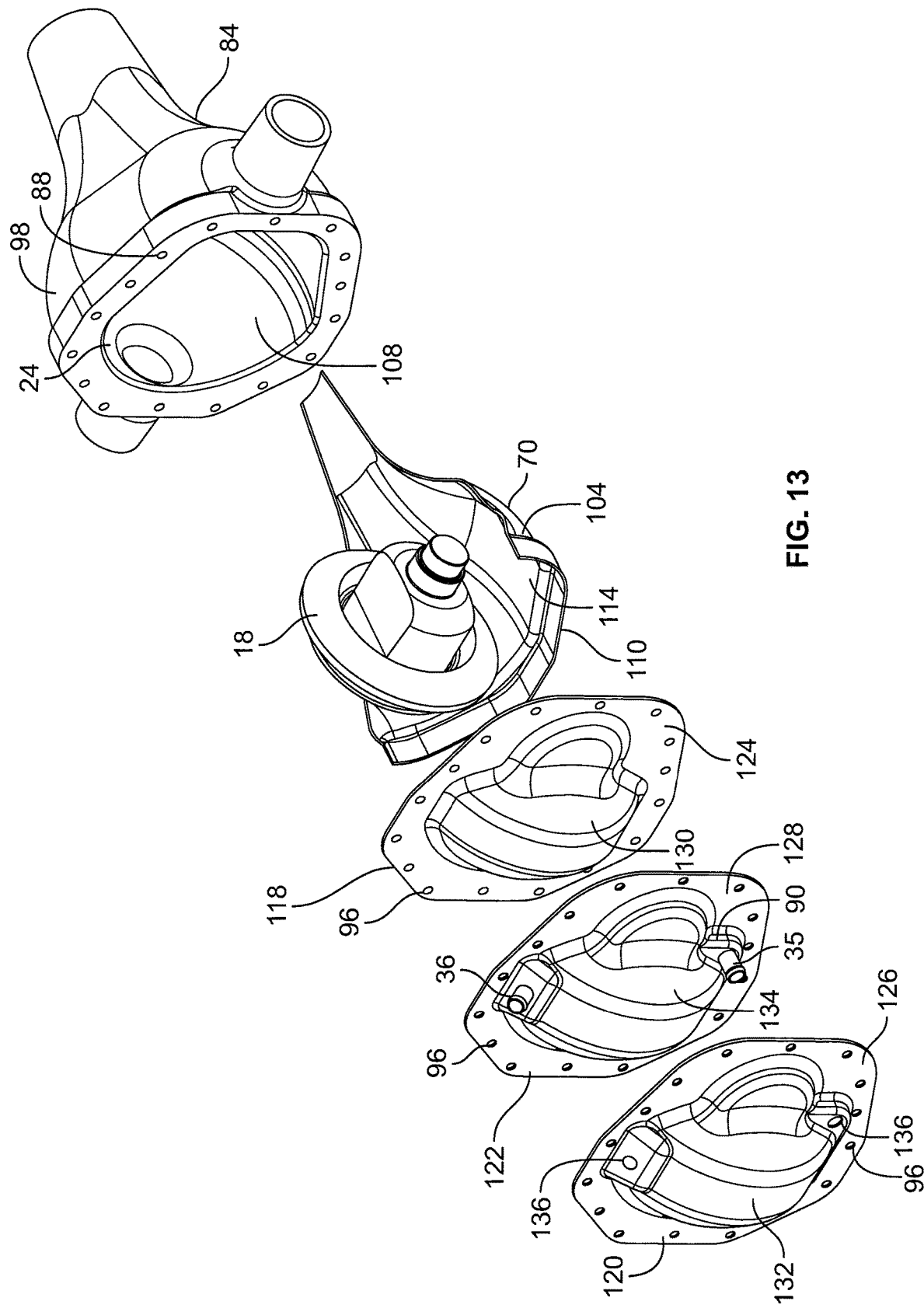
FIG. 13 is an exploded top view at an angle of the power and torque transfer unit of the example embodiment shown in FIG. 11.
Figure 14:
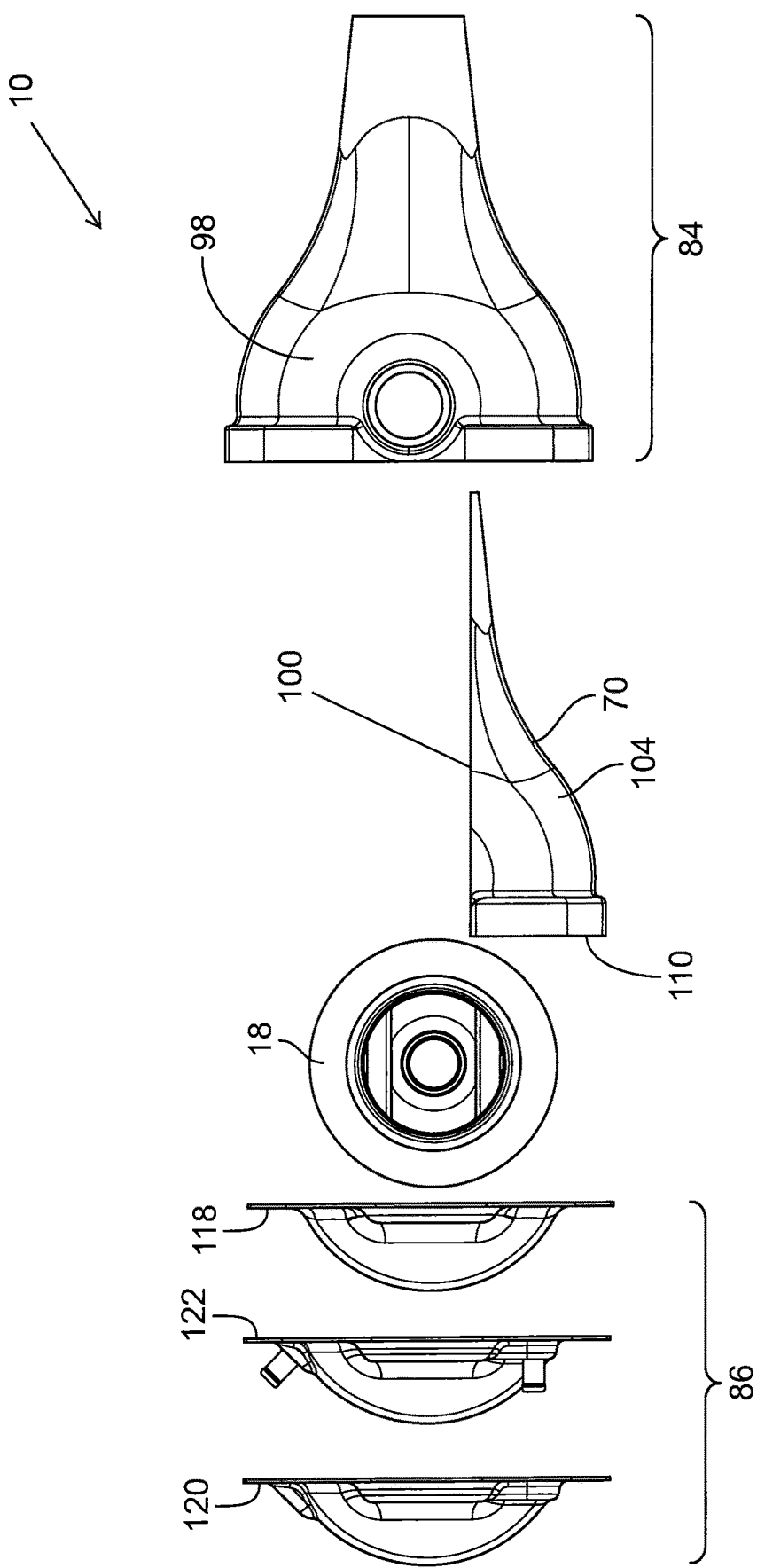
FIG. 14 is an exploded side view at an angle of the power and torque transfer unit of the example embodiment shown in FIG. 11.

As with the first heat exchanger 30, the second heat exchanger 60 can be designed with a single pass (i.e. I-flow) fluid passageway 34 or with a two pass fluid flow passageway (i.e. U-flow) as shown schematically in FIG. 6 in accordance with principles known in the art. Once again, the inlet and outlet ports 35, 36 are located on the back or outer surface 48 of the tubular member 32 forming the second heat exchanger 60 and are in communication with corresponding inlet/outlet fittings that extend through corresponding openings (not shown) formed in the wall of the housing 14 for directing a first heat exchange fluid into and out of fluid passageway 34 of the second heat exchanger. Therefore, whether the first or second heat exchanger 30, 60 is used, the first or second heat exchanger 30, 60 is in fluid communication with a coolant circuit within the overall automobile system. Depending upon the particular design of the warming and cooling system for the housing 14, the first or second heat exchanger 30, 60 may be provided with the same first heat exchange fluid or with different first heat exchange fluids.

During operation of the automobile when the axle oil has reached its optimal operating temperatures, the rotation of the pinion gear 16 and ring gear 18 causes the "hot" oil to flow within the fluid channels 53, 54 formed by the annular gaps created between the outer surfaces of the ring gear 18 or pinion gear 16, respectively and the corresponding inner surface 50 of the first or second heat exchanger 30, 60 depending on whether a first or second heat exchanger 30, 60 is used. As the first heat exchange fluid (i.e. coolant) flows in and out of the first or second heat exchanger 30, 60 that is strategically arranged in relation to the ring gear 18 or the pinion gear 16, heat is transferred from the oil circulating through the housing 14 to the first heat exchange fluid flowing through either the first and second heat exchanger 30, 60 which ultimately conducts the heat outside the housing 14 providing for rather complete cooling of the oil within the housing 14.

Conversely, at start-up conditions when the oil or fluid is cold and has increased viscosity due to the reduced temperature, as the first heat exchange fluid flows in and out of either the first or second heat exchanger 30, 60, heat can instead be transferred from the first heat exchange fluid to the oil circulating within the housing 14 in order to aide in bringing the oil or fluid, whether it be differential axle oil or manual transmission oil, up to its desired operating temperature.

In some instances, in order to provide for more complete warming and/or cooling of the oil circulating within the housing 14 of the power and torque transfer unit 10, both the first and second heat exchanger 30, 60 may be strategically positioned within the housing 14 in relation to the ring gear 18 and the pinion gear 16 as in the above-described embodiments. Therefore, warming and/or cooling by means of heat exchangers 30, 60 occurs in proximity to both the ring gear 18 and pinion gear 16. In such instances, depending upon the particular design of the warming and cooling system for the housing 14 of the power and torque transfer unit 10, the first and second heat exchanger 30, 60 may be provided with the same first heat exchange fluid or with different first heat exchange fluids.

By assisting with both the cooling and/or warming of the oil circulating within the power and torque transfer unit 10, such as a differential, the strategic arrangement of the first and/or second heat exchangers 30, 60 within the housing in relation to the ring gear 18 and/or pinion gear 16, along with insulation, allows the entire gear system housed within the casing 14 to operate properly and efficiently thereby assuring long term reliability for the power and torque transfer unit 10 which contributes to the overall performance of the automobile.

While the above-described exemplary embodiment has been described making reference to first and second heat exchangers 30, 60 with the first heat exchanger being positioned in relation to ring gear 18 and the second heat exchanger being positioned in relation to pinion gear 16, it will be understood that these terms have been used for ease of reference and that, instead, a first heat exchanger could be positioned in relation to the pinion gear 16 and a second heat exchanger positioned in relation to the ring gear 18 or that only one of the first heat exchanger 30 and second heat exchanger 60 may be provided. More specifically, it will be understood that while the above-described exemplary embodiment has been described as generally incorporating a first heat exchanger 30 or a second heat exchanger 60, it is contemplated within the scope of the present disclosure that the system may include either a first heat exchanger or a second heat exchanger arranged in relation to either the ring gear 18 (as shown in FIG. 1) or in other embodiments in relation to the pinion gear 16 (as shown in FIG. 1A) or that the system may include both a first heat exchanger and a second heat exchanger.

In another embodiment, as shown in FIGS. 1C and 1D, the torque and power transfer unit 10 can be provided with a plate-type heat exchanger, as the first heat exchanger. As opposed to the other heat exchangers shown in FIGS. 1, 1A and 1B, where the heat exchanger is arcuate, the first heat exchanger 30 shown in FIG. 1C can be a flat plate-type heat exchanger, which can have a rectangular configuration (FIG. 1D) or arched on ones-side (FIG. 1C), with the concave face of the arched side facing the ring gear 18. The flat plate-type heat exchangers having a rectangular configuration are not particularly limited and should be known to a person of skill in the art.

The plate-type heat exchanger (first heat exchanger 30) as shown in FIGS. 1C and 1D can be positioned within an outer wall of the housing 14 and the ring gear 18. The plate-type heat exchanger (first heat exchanger 30) can be positioned such that the plurality of plates are positioned one on top of another, with the lower most plate (or plate pair) being closest to the first inner surface 72 of the housing 14, and the top most plate (or plate pair) being closest to the second inner surface 78 of the housing 14. In another embodiment, the plate-type heat exchanger (first heat exchanger 30) can be positioned with the plates extending from the first inner surface 72 to the second inner surface 78. The plate-type heat exchanger (first heat exchanger 30) is also provided with an inlet port 35 and outlet port 36 to permit flow of a fluid to control within the plate-type heat exchanger (first heat exchanger 30) and for heat exchange with the oil or lubricant within the power and torque transfer unit 10. In addition, as shown in FIG. 1C, the power and torque transfer unit 10 can be provided with a second heat exchanger 60, positioned adjacent to the pinion gear 16, as described above. Alternatively, as shown in FIG. 1D, the power and torque transfer unit 10 is provided with a single heat exchanger 30 to control and maintain the temperature of the oil or lubricant inside the power and torque transfer unit 10.

FIGS. 7 to 10 is an exemplary embodiment of a power and torque transfer unit in accordance with the disclosure. As noted above, the power and torque transfer unit 10 has a housing 14. In the embodiment shown in FIGS. 7 to 10, the housing 14 is formed by a first housing section 84 and a second housing section 86, which are affixed together to form the casing or housing 14. In the embodiment shown, the first housing section 84 has openings for receiving the pinion shaft, and the right and left axles (not shown). The first housing section 84 can be generally cone shaped forming a major portion of the power and torque transfer unit 10. In addition, the peripheral edge of the first housing section 84 that faces the second housing section 86 can be provided with apertures 88 for receiving affixing means (such as bolts, not shown) for coupling the first housing section 84 to the second housing section 86.

The second housing section 86 forms a cover to enclose the housing 14 and can be shaped to accommodate the components positioned within the housing 14. In the embodiment shown in FIGS. 7 to 10, the second housing section 86 is provided with a protrusion 90 to accommodate the heat exchanger 30 within the housing 14. The protrusion 90 can be shaped to be similar to the shape of the heat exchanger 30, which can be a plate-type or plate-and-fin type heat exchanger. The protrusion on the second housing section 86 is also provided with an inlet port 35 and an outlet port 36 that are in fluid communication with the inlet 92 and outlet 94, respectively, of the heat exchanger 30 permitting fluid flow from the inlet port 35 to the outlet port 36. The second housing section 86 is also provided with openings 96 to receive affixing means (not shown) for coupling the second housing section 86 to the first housing section 84, and form the casing or housing 14. Further, upon coupling the first housing section 84 to the second housing section 86, the housing 14 provides an internal surface or inner wall 24 and an external surface 98, with the fluid (or oil) being contained within and coming in contact with the internal surface 24 of the housing 14 during operation.

As described above, the ring gear 18 and pinion gear (not shown and as described above) is enclosed within the housing 14, with the heat exchanger 30 spaced from the ring gear 18. The embodiment shown in FIGS. 7 to 10 are also provided with a first insulation 70 that is in contact with the internal surface 24 of the housing 14. The first insulation 70 is formed of a first section 100 and a second section 102. The first section 100 of the first insulation 70 is positioned in the first housing section 84, and the second section 102 of the first insulation 70 is positioned in the second housing section 86.

The first section 100 and the second section 102 of the first insulation 70 are shaped complementary to the first housing section 84 and the second housing section 86, respectively. In the embodiment shown in FIGS. 7 to 10, the first section 100 has a shape similar to the internal surface 24 of the first housing section 84, and the second section 102 of the first insulation 70 has a shape similar to the internal surface of the second housing section 86. In addition, the second section 102 has an orifice 116 that allows the inlet port 35 to connect with the inlet 92 of the heat exchange 30.

Further, the outer surface 104 of the first section 100 and the outer surface 106 of the second section 102 of the first insulation 70 are in contact with the first internal surface 108 of the housing 14. The first internal surface 108 being the lower part of the housing 14 that carries the fluid during inactivity (and functioning as a reservoir or sump portion) of the gear system (pinion and ring gears 16, 18). By having the entire outer surface (104, 106) of the first insulation 70 in contact with the first internal surface 108 of the housing 14, the entire first internal surface 108 of the housing 14 that is in contact with the first insulation 70 can be insulated to control the temperature of the fluid within the housing. However, as described above, only a portion of the first internal surface 108 of housing 14 may be in contact with the first insulation 70. Alternatively, more than the first internal surface 108, in other words, most of the inner wall or surface 24 of the housing 14, or all of it, may have the first insulation 70. The extent of coverage is not particularly limited, and can be varied depending upon the design and application requirements. In addition, by utilizing the above, minimal impact on the volume within the housing 14 occurs, helping to avoid substantially increasing the size of the housing 14, which can be a significant consideration.

Upon assembly, a peripheral edge 110 of the first section 100 of the first insulation 70 contacts a peripheral edge 112 of the second section 102 of the first insulation 70, with the internal surfaces 114 of the first and second sections 100, 102 of the first insulation 70 together forming a container that contacts the fluid within the housing 14. In the embodiment shown in FIGS. 7 to 10, the heat exchanger 30 is positioned proximate to the second section 102 of the first insulation 70, with the heat exchanger 30 being spaced from both the ring gear 18 and the second section 102 of the first insulation 70 to permit fluid to contact the heat exchanger 30. During operation, as described above, the fluid is circulated within the housing 14, while the first insulation 70 insulating the fluid within the housing for warming and/or cooling the fluid within the power and torque transfer unit 10.

FIGS. 11 to 14 disclose another further embodiment of a power and torque transfer unit 10. Similar to the embodiment shown in FIGS. 7 to 10, the embodiment disclosed in FIGS. 11 to 14, the casing or housing 14 is formed of a first housing section 84 and a second housing section 86. The first housing section 84 is similar to the first housing section 84 described above with respect to FIGS. 7 to 10, and the ring gear 18, pinion gear and pinion shaft (not shown) are similar to the embodiment disclosed herein above.

Like the embodiment in FIGS. 7 to 10, the embodiment in FIGS. 11 to 14 is provided with a first insulation 70 positioned within the housing 14. In addition, the first insulation 70 has an outer surface 104 that is in complete contact with the first inner surface 108 of the housing 14, and an internal surface 114 that contacts the fluid within the housing 14. The shape of the first insulation 70 is not particularly limited and can be varied depending upon design and application requirements. In the embodiment shown in FIGS. 11 to 14, the first insulation 70 is shaped similar to a half cone, with the half being formed along the cones length. Hence, the first insulation 70 shown in FIGS. 11 to 14 covers a greater surface area within the housing 14 than the first insulation 70 provided in FIGS. 7 to 10. However, as mentioned, the shape and surface area covered by the first insulation 70 within the housing 14 can be varied, so long as the entire outer surface 104 of the of the first insulation is in contact with an internal surface 24 of the housing 14.

In contrast to the embodiment disclosed in FIGS. 7 to 10, the second housing section 86 of the embodiment shown in FIGS. 11 to 15 is formed of an inner cover plate 118, a front plate 120 and an intermediate cover plate 122 sandwiched between the inner cover plate 118 and the front plate 120.

The size and shape of the inner, external and intermediate cover plates (118, 120, 122) is similar to each other, so together can form the second housing section 86. Further, in the embodiment disclosed, each of the cover plates (118, 120, 122) is provided with a flat planer surface (124, 126, 128), with the external face of the flat planar surface 124 of the inner cover plate 118 being contact with the inner face of the flat planar surface 128 of the intermediate cover plate 122; and the external face of the flat planar surface 128 of the intermediate cover plate 122 being in contact with the inner face of the flat planar surface 126 of the front plate 120. In the current instance, the inner face of the cover plates (118, 120, 122) refers to the surface facing the internal cavity of the housing 14, and the external face being opposed to the internal face.

Each of the cover plates (118, 120, 122) is provided with a plurality of openings 96, which are aligned with each other and also with the apertures 88 on the peripheral edge of the first housing section 84, to receive fastening means, such as bolts, screws, etc. for affixing the first housing section 84 to the cover plates (118, 120, 122).

Each of the cover plates (118, 120, 122) is also provided with an arced surface (130, 132, 134) that conforms partly in shape to the ring gear 18 to accommodate the ring gear 18 within the housing 14. The shape of the arced surface (130, 132, 134) is not particularly limited and can be varied, depending upon design and application requirements. However, in contrast to the embodiment disclosed in FIGS. 7 to 10, the arced surface protrudes significantly less in the embodiment shown in FIGS. 11 to 15, which helps to reduce the overall size of the power and torque transfer unit 10. The inner face of the arced surface 130 of the inner cover plate 118 is spaced apart from the ring gear 18 to allow for rotation of the ring gear 18 and for the fluid within the housing 14 to flow in between the inner face of the arced surface 130 and the ring gear 18. As described above, the inner face of the arced surface refers to the surface facing the internal cavity of the housing 14.

The intermediate cover plate 122 is adjacent to and couples to the inner cover plate 118, with the flat planar surface 128 of the intermediate cover plat 122 being in contact with the flat planar surface 124 of the inner cover plate 118. However, the arced surface 134 of the intermediate cover plate 122 is spaced apart from the arced surface 130 of the inner cover plate 118, providing a channel or passage for flow of a heat exchanger fluid.

The intermediate cover plate 122 is also provided with an inlet 35 and outlet 36, which is in fluid communication with the passage for flow of the heat exchanger fluid. In the embodiment shown in FIGS. 13 and 14, the inlet 35 is provided on a protrusion 90 which is in fluid communication with the passage for flow of the heat exchanger fluid; while the outlet 36 is provided proximate to an opposed end (opposed to the end where the inlet 35 is present) of the inner cover plate 122 on the curved surface 134. As should be recognized by a person of ordinary skill in the art, the position of the inlet 35 and outlet 36 is not particularly limited, and can be varied depending upon the design and application requirements. Further, similar to the embodiment shown in FIGS. 7 to 10, the inlet 35 and outlet 36 can be provided on opposing ends of the arced surface 134 of the intermediate cover plate 122.

During operation, heat exchanger fluid enters through the inlet 35 and flows in the passage formed between the arced surfaces (130, 134) and protrusion 90 of the inner cover plate 118 and the intermediate cover plate 122, and flows out from the outlet 36. This allows the inner face of the arced surface 130 of the inner cover plate 118 to function as a heat exchanger with the fluid within the internal cavity of the housing 14.

In contrast to the embodiment shown in FIGS. 7 to 10, the heat exchanger in the embodiment shown in FIGS. 11 to 14 is formed by the inner cover plate 118 and the intermediate cover plate 122. Further, depending upon the material of construction, although not shown, the housing 14 can be formed of the first housing section 84 being coupled to the inner and intermediate cover plates (118, 122) to enclose the cavity within the housing 14, i.e. without the use of front plate 120. In such an instance, the material of construction of the intermediate cover plate 122 can be selected to avoid heat exchange with the environment from the external face (which faces away from the internal cavity of the housing 14) of the intermediate cover plate 122.

In the embodiment shown in FIGS. 11 to 14, a front plate 120 is provided that sandwiches the intermediate cover plate 122 with the inner cover plate 118. The front plate 120 is shaped similar to the intermediate cover plate 122 with the flat planar surface 126 of the front plate 120 being in contact with the flat planar surface 128 of the intermediate cover plate 122. Unlike the relationship between the arced surfaces 130, 134 of the inner cover plate 118 and the intermediate cover plate 122, which is spaced apart to provide the passage for the heat exchanger fluid, the arced surface 132 of the front plate 120 is in contact with the arced surface 134 of the intermediate cover plate 122. In addition, the front plate 120 is also provided with holes 136 that align with and accommodate the inlet port 35 and outlet port 36.

In a further embodiment, the front plate 120 can be formed of an insulating material, being similar to and forming the second insulating layer 74, as described above. Moreover, the material of construction of the front plate 120 can be varied depending upon the design and application requirements; particularly, when the front plate 120 functions as a second insulating layer 74, the material can be the same or different from the first insulating layer 70. In addition, when functioning as an insulating layer, the front plate 120 can cover only a portion of the intermediate cover plate 122, depending upon the design and application requirements.

Figure 15:
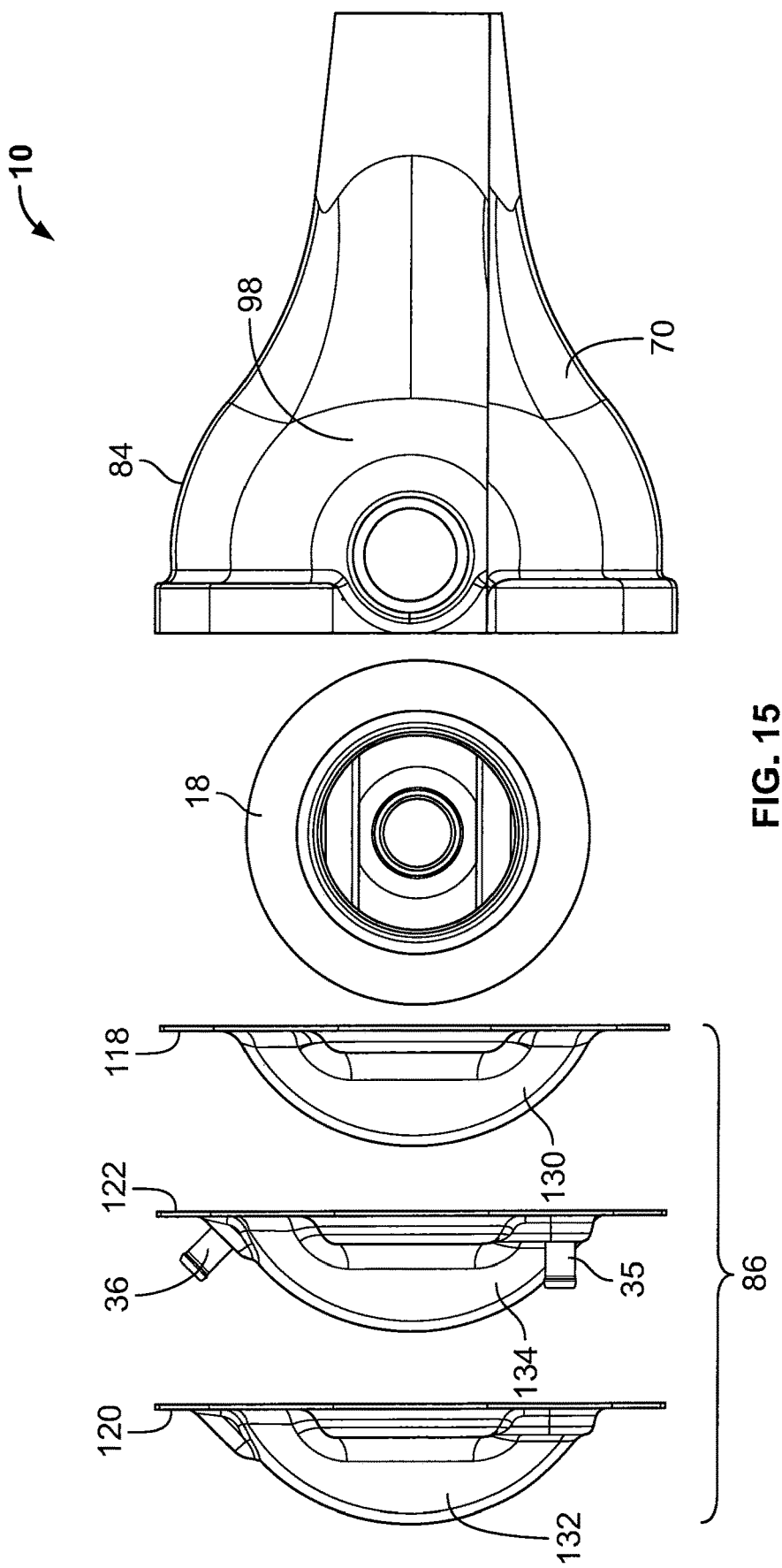
FIG. 15 is a partially exploded side view of a power and torque transfer unit of a further example embodiment.
Figure 16:
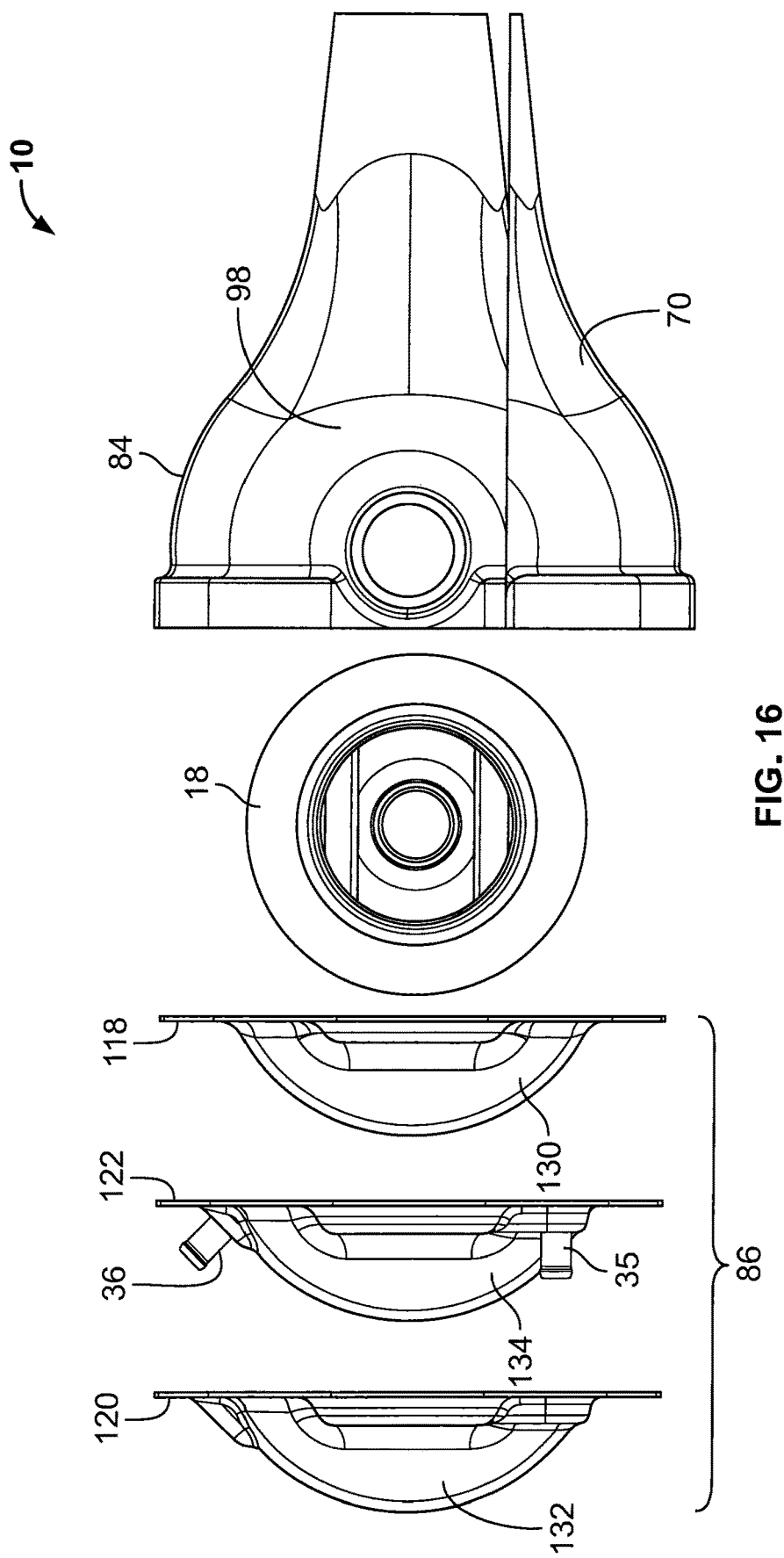
FIG. 16 is a partially exploded side view, showing separation of the first insulation, of a power and torque transfer unit of the example embodiment shown in FIG. 15.
Figure 17:
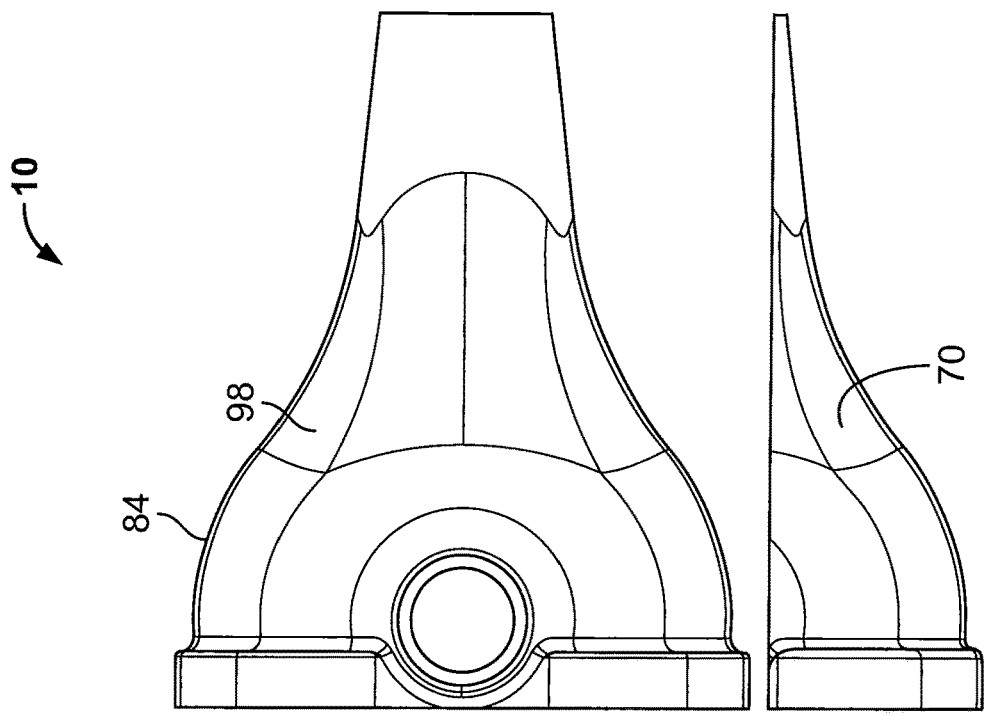
FIG. 17 is an exploded side view of a power and torque transfer unit of the example embodiment shown in FIG. 15.
Figure 17:
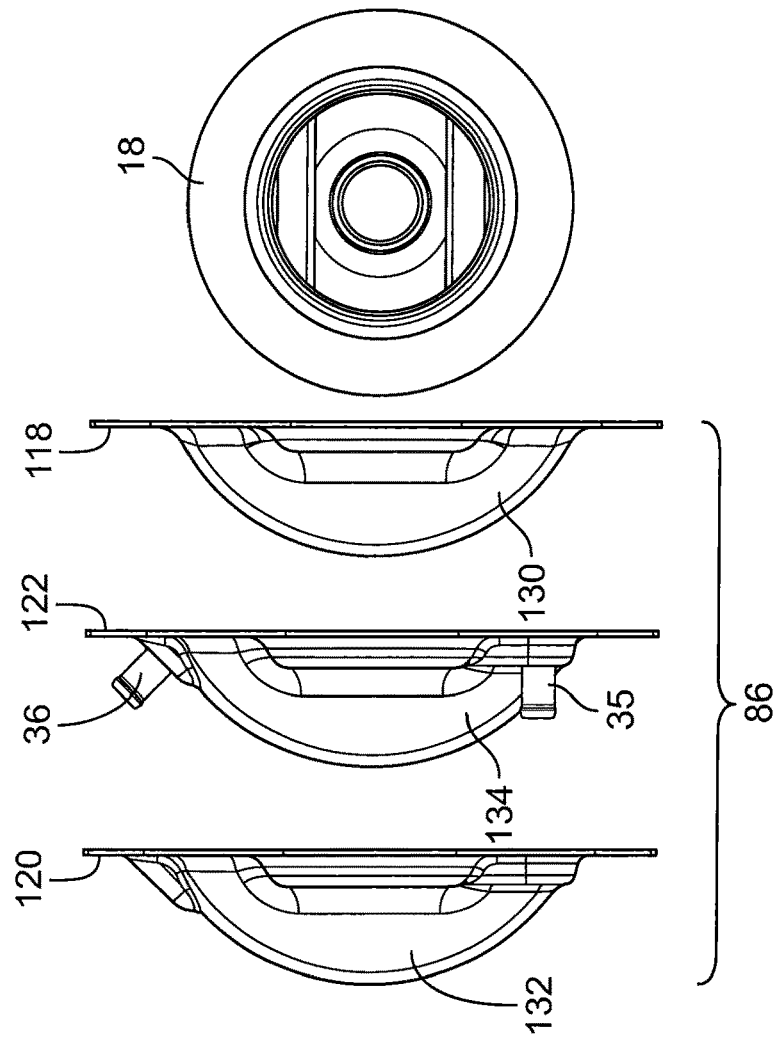

FIGS. 15 to 17 relates another further embodiment disclosed herein. The power and torque transfer unit 10 disclosed in FIGS. 15 to 17 is similar to the embodiment disclosed in FIGS. 11 to 14 (reader is referred to the relevant section above), with the difference being that the first insulation layer 70 is coupled to an external surface 98 of the first housing section 84. In such an embodiment, the internal surface 114 of the first insulation layer 70 is in contact with the external surface 98 of the first housing section 84. FIG. 15 shows the first insulation layer 70 in contact with the first housing section 84, and FIG. 16 shows the first insulation layer 70 partly removed or before coupling of the first insulation layer 70 with the first housing section 84. While FIG. 17 shows the first insulation layer 70 being completely separated from the first housing section 84.

The insulating layer used is not particularly limited and can be varied depending upon the design and application requirements. In one embodiment, for example and without limitation, a heat shield, a ceramic paint, a thermal barrier coating or a heat wrap can be used. In certain instances, the insulating material is sprayed on to the parts being coated.

While the above-described exemplary embodiments have been described primarily in relation to a power and torque transfer system or unit 10 of an automotive vehicle, such as a differential, it will be understood that the heat exchanger(s)

and system according to the present disclosure can be modified for different applications within the automotive vehicle, such as the manual transmission. More specifically, the manual transmission also comprises an outer housing 14 enclosing or encasing a gear system. During operation of the vehicle, transmission oil circulates within the housing. While cooling of the transmission oil circulating within the housing 14 may be advantageous in certain applications, operation of the manual transmission would benefit from warming of the transmission oil circulating within the housing in certain situations in order to assist with bringing the transmission oil to its optimal operating temperature especially at cold-start conditions. Therefore, in order to provide for warming (and/or cooling) of the transmission oil in a manual transmission a first and/or second heat exchanger 30, 60 can be arranged within the manual transmission housing intermediate the inner wall 24 of the housing 14 and the outer surface of corresponding gear forming part of the gear system enclosed therein. The heat exchanger 30, 60 arranged within the manual transmission housing will have a similar configuration as the heat exchanger 30, 60 described above and will function in a similar manner in that a first heat exchange fluid flowing through the heat exchanger(s) will transfer heat to (or from) the transmission oil that is brought into heat transfer relationship with the primary heat transfer surface of the heat exchanger by means of rotation of the gears within the gear system which causes the transmission oil to circulate and/or splash within the housing. Accordingly, similar arrangements as those described above in connection with the power and torque transfer unit 10 can be applied to differential systems, manual transmission and/or other systems within an automotive vehicle involving an outer housing enclosing a gear system with a fluid circulating within the housing.

Therefore, while various exemplary embodiments have been described and shown in the drawings, it will be understood that certain adaptations and modifications of the described exemplary embodiments can be made as construed within the scope of the present disclosure. Therefore, the above discussed embodiments are considered to be illustrative and not restrictive.

| Parts List | |
|---|---|
| No. | Description |
| 10 | power and torque transfer unit |
| 12 | pinion shaft |
| 13 | Pinion bearings |
| 14 | outer casing or housing |
| 15 | Pinion shaft pocket |
| 16 | pinion gear |
| 18 | ring gear |
| 20 | directional arrow (and 21) |
| 24 | Inner surface or inner wall |
| 26 | First gap b/w 24 & 18 |
| 28 | Second gap b/w 24 & 16 |
| 29 | Bottom or lower portion |
| 30 | 1$^{st}$ heat exchanger (HX) |
| 32 | Tubular member |
| 34 | Fluid passageway |
| 35 | Inlet port |
| 36 | Outlet port |
| 38 | Mating plate pair |
| 40 | Mating plate pair |
| 42 | Length of HX |
| 44 | Width of HX |
| 46 | Depth of HX |
| 48 | Back or outer surface of 32 |
| 50 | Front or inside surface |

-continued

| Parts List | |
|---|---|
| No. | Description |
| 52 | Protrusions |
| 53 | Fluid channel |
| 54 | Second fluid channel/passageway |
| 55 | Heat transfer surface |
| 57 | Annular space b/w 48 and 24 |
| 60 | Second HX |
| 70 | First insulation |
| 72 | First inner surface of 14 |
| 74 | Second insulation layer |
| 76 | Third insulation layer |
| 78 | Second inner surface of 14 |
| 80 | Cut-out |
| 82 | outer insulation |
| 84 | first housing section |
| 86 | Second housing section |
| 88 | apertures |
| 90 | protrusion |
| 92 | Inlet |
| 94 | outlet |
| 96 | openings |
| 98 | External surface of housing |
| 100 | First section |
| 102 | Second section |
| 104 | Outer surface of 100 |
| 106 | Outer surface of 102 |
| 108 | First internal surface of 14 |
| 110 | Peripheral edge of 100 |
| 112 | Peripheral edge of 102 |
| 114 | Internal surface of 70 |
| 116 | orifice |
| 118 | Inner cover plate |
| 120 | Front plate |
| 122 | Intermediate cover plate |
| 124 | Flat planar surface of 118 |
| 126 | Flat planar surface of 120 |
| 128 | Flat planar surface of 122 |
| 130 | Arced surface of 118 |
| 132 | Arced surface of 120 |
| 134 | Arced surface of 122 |
| 136 | holes |

What is claimed is:

1. A differential unit for an automotive vehicle, comprising:
a gear system for transmitting torque and rotation to wheels of the automotive vehicle, the gear system comprising at least a ring gear and a pinion gear, the ring gear and pinion gear arranged in meshing relationship for rotational movement;
a housing enclosing said gear system;
a first heat exchanger coupled to the housing for warming and/or cooling the fluid circulating in the housing, the first heat exchanger having:
a tubular member having spaced apart walls defining a fluid passageway therebetween for the flow of a first heat exchanger fluid through the heat exchanger;
a primary heat transfer surface defined by one of said spaced apart walls of the tubular member;
an inlet port and an outlet port in fluid communication with said fluid passageway for inletting and discharging said first heat exchange fluid into said heat exchanger from exterior the housing;
a first insulation layer operatively coupled to the housing for insulating the fluid circulating in the housing, the first insulation layer having a first face and an opposing second face, with the entire first face being in contact with the housing; and a second fluid passageway formed between the outer surface of the gear and the primary heat transfer surface for the flow of the fluid circulating within the housing therethrough;

wherein the fluid is brought into heat transfer relationship with the first heat exchange fluid flowing through the first heat exchanger by means of rotation of the gear system wherein the housing has a first housing section coupled to a second housing section, the first housing section being cone shaped and having openings for receiving a shaft and an axle that is perpendicular to the shaft, the second housing section facing the first housing section to enclose a ring gear within the housing, the second housing section formed to have the first heat exchanger coupled to the second housing section, wherein the second housing section comprises an inner cover plate and a front plate sandwiching an intermediate cover plate, each of the inner cover plate, the front plate and the intermediate cover plate having a flat planar surface, with opposing faces of the flat planar surface of the intermediate cover plate contacting the inner cover plate and front plate;

each of the inner cover plate, the front plate and the intermediate cover plate having a arced surface, with the arced surface of the intermediate cover plate being spaced from the arced surface of the inner cover plate providing a passage for a heat exchanger fluid;

the intermediate cover plate having an inlet port and an outlet port in fluid communication with the passage; and the front plate having holes for receiving the inlet port and the outlet port.

2. The differential unit according to claim 1, wherein the first insulation layer is coupled to an internal surface of the housing.

3. The differential unit according to claim 1, wherein the first insulation is coupled to a first internal surface of the housing, the first internal surface being part of the housing carrying the fluid during inactivity of the gear system.

4. The differential unit to claim 1, wherein the first insulation layer has a first section of the first insulation layer and a second section of the first insulation layer, both the first section and the second section of the first insulation layer coupled to the first internal surface of the housing, with a peripheral edge of the first section being in contact with a peripheral edge of the second section of the first insulation layer.

5. The differential unit according to claim 1, wherein the first insulation layer is coupled to an external surface of the housing.

6. The differential unit according to claim 1, wherein the first insulation is coupled to a first external surface of the housing, the first external surface being part of the housing carrying the fluid during inactivity of the gear system.

* * * * *